United States Patent
Cohen et al.

(10) Patent No.: US 8,879,841 B2
(45) Date of Patent: Nov. 4, 2014

(54) ANISOTROPIC DENOISING METHOD

(75) Inventors: Noy Cohen, Tel-Aviv (IL); Jeffrey Danowitz, Tel-Aviv (IL); Orly Liba, Tel-Aviv (IL)

(73) Assignee: Fotonation Limited, Ballybrit, Galway (IE)

( * ) Notice: Subject to any disclaimer, the term of this patent is extended or adjusted under 35 U.S.C. 154(b) by 866 days.

(21) Appl. No.: 13/038,094

(22) Filed: Mar. 1, 2011

(65) Prior Publication Data

US 2012/0224784 A1    Sep. 6, 2012

(51) Int. Cl.
 *G06K 9/00*   (2006.01)
 *G06T 5/00*   (2006.01)

(52) U.S. Cl.
 CPC ....... *G06T 5/002* (2013.01); *G06T 2207/20192* (2013.01)
 USPC .......................................... 382/167; 382/265

(58) Field of Classification Search
 None
 See application file for complete search history.

(56) References Cited

U.S. PATENT DOCUMENTS

| | | | | |
|---|---|---|---|---|
| 6,633,683 | B1 * | 10/2003 | Dinh et al. | 382/260 |
| 7,616,829 | B1 * | 11/2009 | Bilbrey et al. | 382/268 |
| 7,657,098 | B2 * | 2/2010 | Lin et al. | 382/199 |
| 7,983,503 | B2 * | 7/2011 | Vakrat et al. | 382/260 |
| 2003/0026495 | A1 * | 2/2003 | Gondek et al. | 382/261 |
| 2003/0053711 | A1 * | 3/2003 | Kim | 382/268 |
| 2005/0025379 | A1 | 2/2005 | Keshet et al. | |
| 2005/0100235 | A1 * | 5/2005 | Kong et al. | 382/261 |
| 2006/0050783 | A1 * | 3/2006 | Le Dinh et al. | 375/240.2 |
| 2006/0245506 | A1 * | 11/2006 | Lin et al. | 375/240.29 |
| 2008/0019605 | A1 * | 1/2008 | Yea et al. | 382/261 |
| 2008/0192064 | A1 * | 8/2008 | Hong et al. | 345/582 |
| 2008/0259190 | A1 | 10/2008 | Bosco et al. | |

(Continued)

FOREIGN PATENT DOCUMENTS

| | | | |
|---|---|---|---|
| EP | 1 289 309 A | | 4/2003 |
| EP | 1 315 367 A2 | | 5/2003 |

(Continued)

OTHER PUBLICATIONS

Japan Patent Office, "Notice of Rejection" in application No. 2011-512240, dated Jun. 25, 2013, 3 pages.

(Continued)

*Primary Examiner* — Sean Motsinger
(74) *Attorney, Agent, or Firm* — Hickman Palermo Truong Becker Bingham Wong LLP

(57) ABSTRACT

In accordance with an embodiment of the invention, an anisotropic denoising method is provided that removes sensor noise from a digital image while retaining edges, lines, and details in the image. In one embodiment, the method removes noise from a pixel of interest based on the detected type of image environment in which the pixel is situated. If the pixel is situated in an edge/line image environment, then denoising of the pixel is increased such that relatively stronger denoising of the pixel occurs along the edge or line feature. If the pixel is situated in a detail image environment, then denoising of the pixel is decreased such that relatively less denoising of the pixel occurs so as to preserve the details in the image. In one embodiment, detection of the type of image environment is accomplished by performing simple arithmetic operations using only pixels in a 9 pixel by 9 pixel matrix of pixels in which the pixel of interest is situated. As a result, improved image environment sensitive noise reduction is achieved that requires a relatively low gate count in hardware implementations.

27 Claims, 20 Drawing Sheets

(56) References Cited

U.S. PATENT DOCUMENTS

| | | | |
|---|---|---|---|
| 2009/0154828 A1* | 6/2009 | Levy et al. | 382/261 |
| 2010/0296737 A1* | 11/2010 | Lin et al. | 382/199 |
| 2011/0090240 A1* | 4/2011 | Cohen | 345/589 |
| 2012/0155783 A1* | 6/2012 | Huang et al. | 382/260 |
| 2012/0224784 A1* | 9/2012 | Cohen et al. | 382/260 |

FOREIGN PATENT DOCUMENTS

| | | | | |
|---|---|---|---|---|
| EP | 1 315367 A | | 5/2003 | |
| EP | 1 315 367 A3 | | 11/2004 | |
| JP | 2003-153290 | | 5/2003 | |
| JP | 2006-033473 | | 2/2006 | |
| WO | WO 2009147535 A1 * | 12/2009 | | G06T 5/20 |

OTHER PUBLICATIONS

Current Claims in application No. 2011-512240, dated Jun. 2013, 11 pages.

Hung-Yi Lo et al., "Directional Weighting-Based Demosaicking Algorithm for Noisy CFA Environments", IEEE, dated 2006, 4 pages.

Hung-Yi Lo et al., "Directional Weighting-Based Demosaicking Algorithm for Noisy CFA Environments" Multimedia and Expo, 2006 IEEE International Conference on IEE, PI Jul. 1, 2006 pp. 489-492.

Lei Zhang et al., Color Reproduction From noisy CFA Data of Single Sensor Digital Cameras, IEE Transactions on Image Processing, IEEE Service Center, Piscataway, NJ. vol. 16 No. 9, Sep. 1, 2007, pp. 2184-2197.

Japan Patent Office, "Office Action" In application No. 2011-512240, dated Mar. 6, 2014, 3 pages.

European Patent Office, "Search Report" in application No. 09 757 888.4-1906, dated Jan. 31, 2014, 5 pages.

Current Claims in application No. 2011-512240, dated Mar. 2014, 3 pages.

Current Claims in application No. 09 757 888.4-1906, dated Jan. 2014, 5 pages.

* cited by examiner

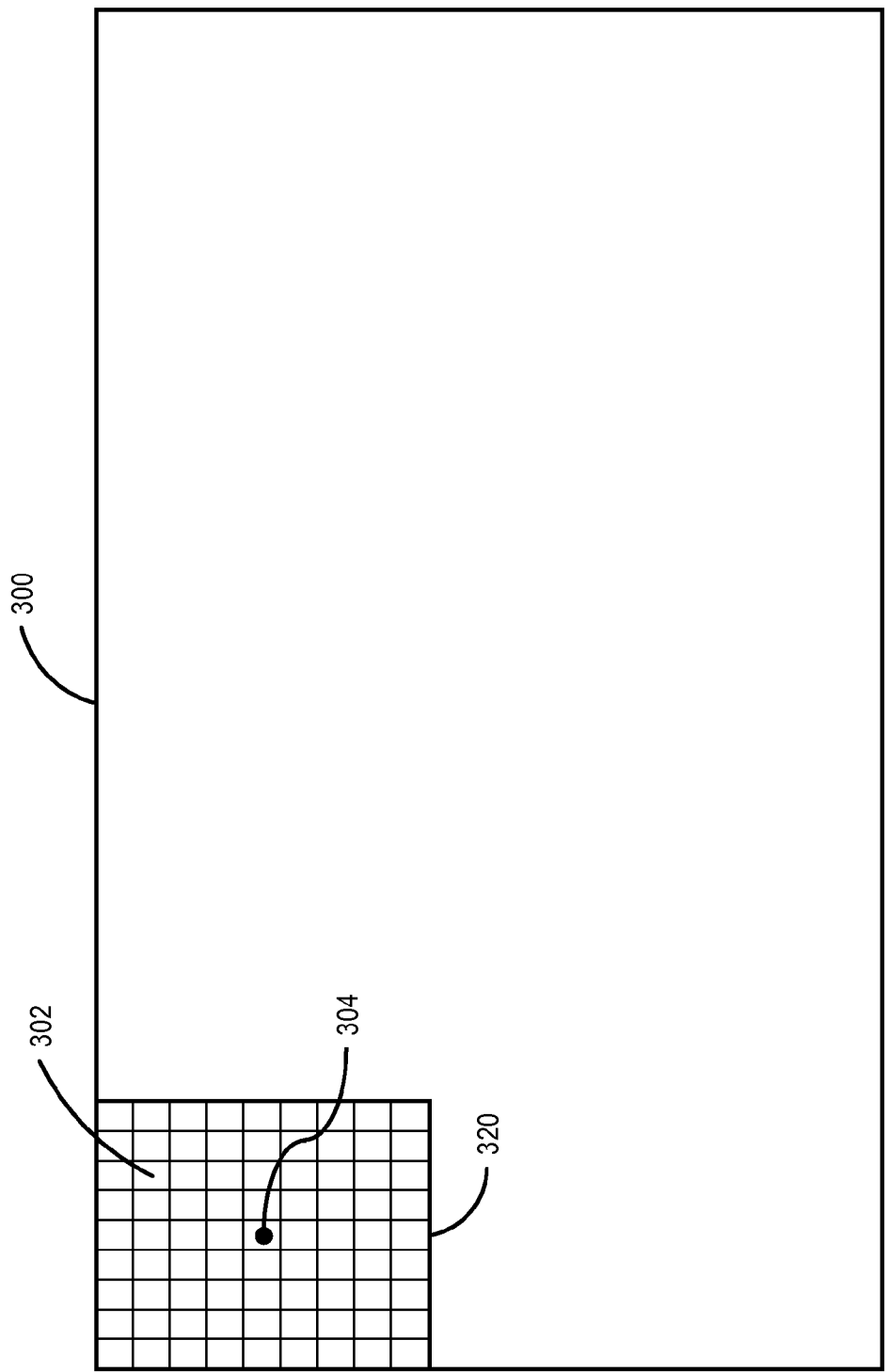

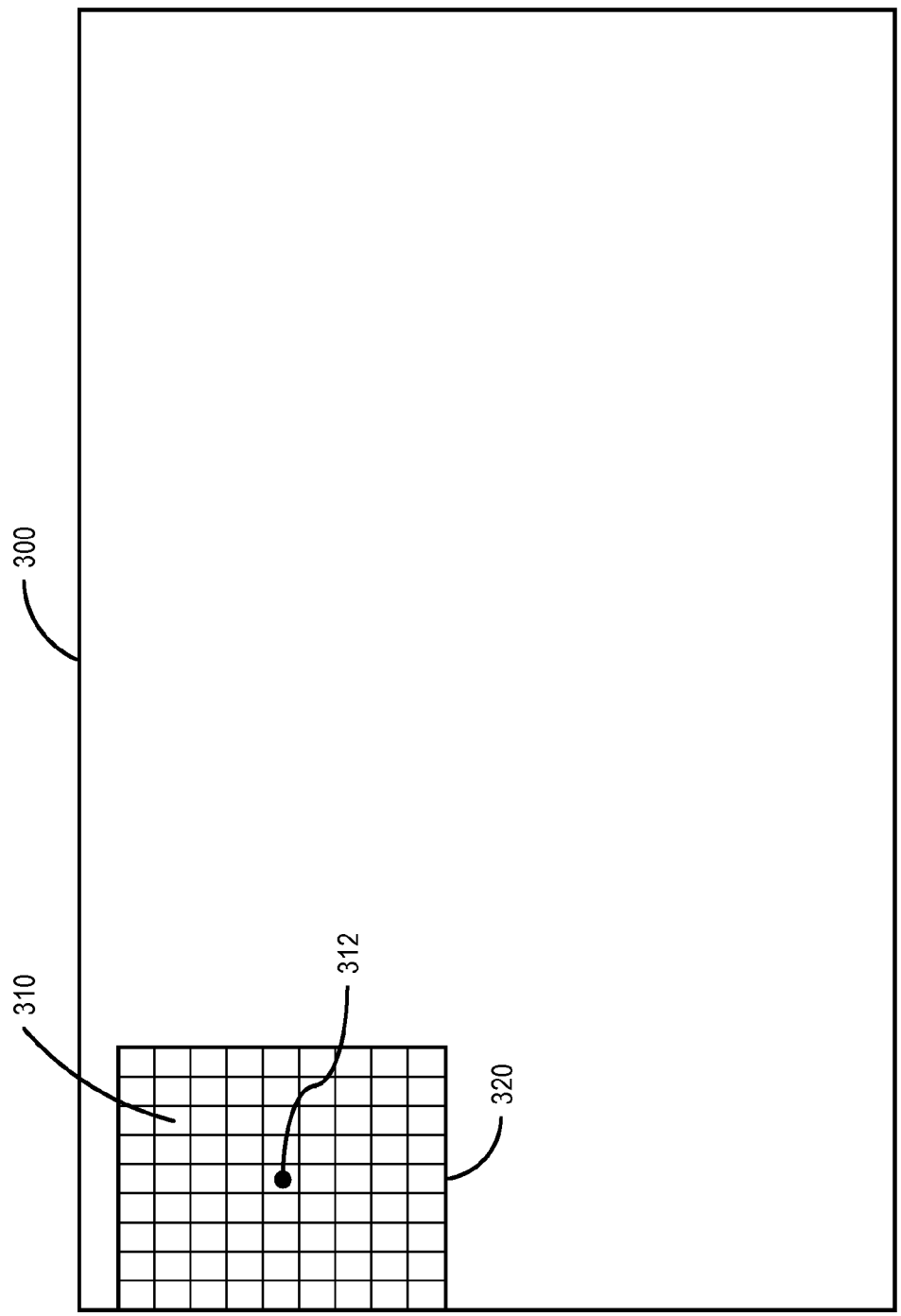

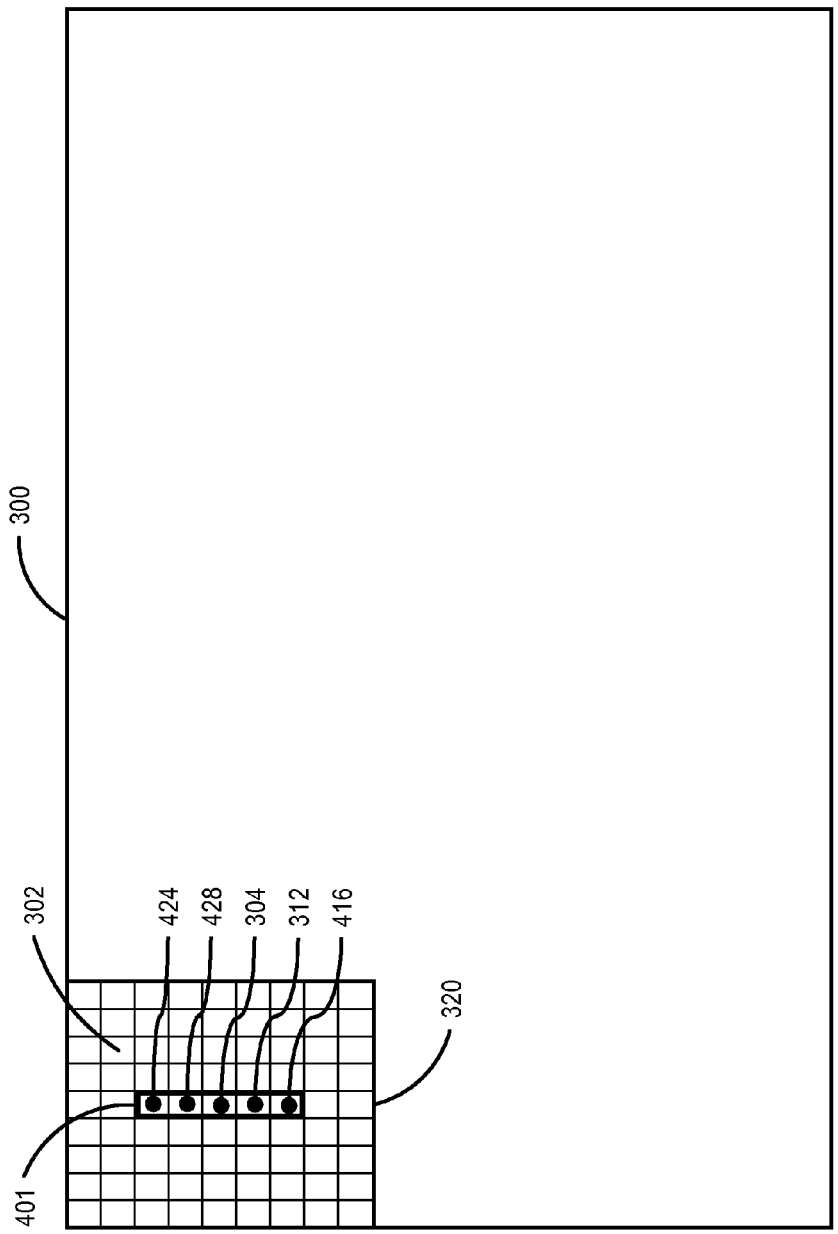

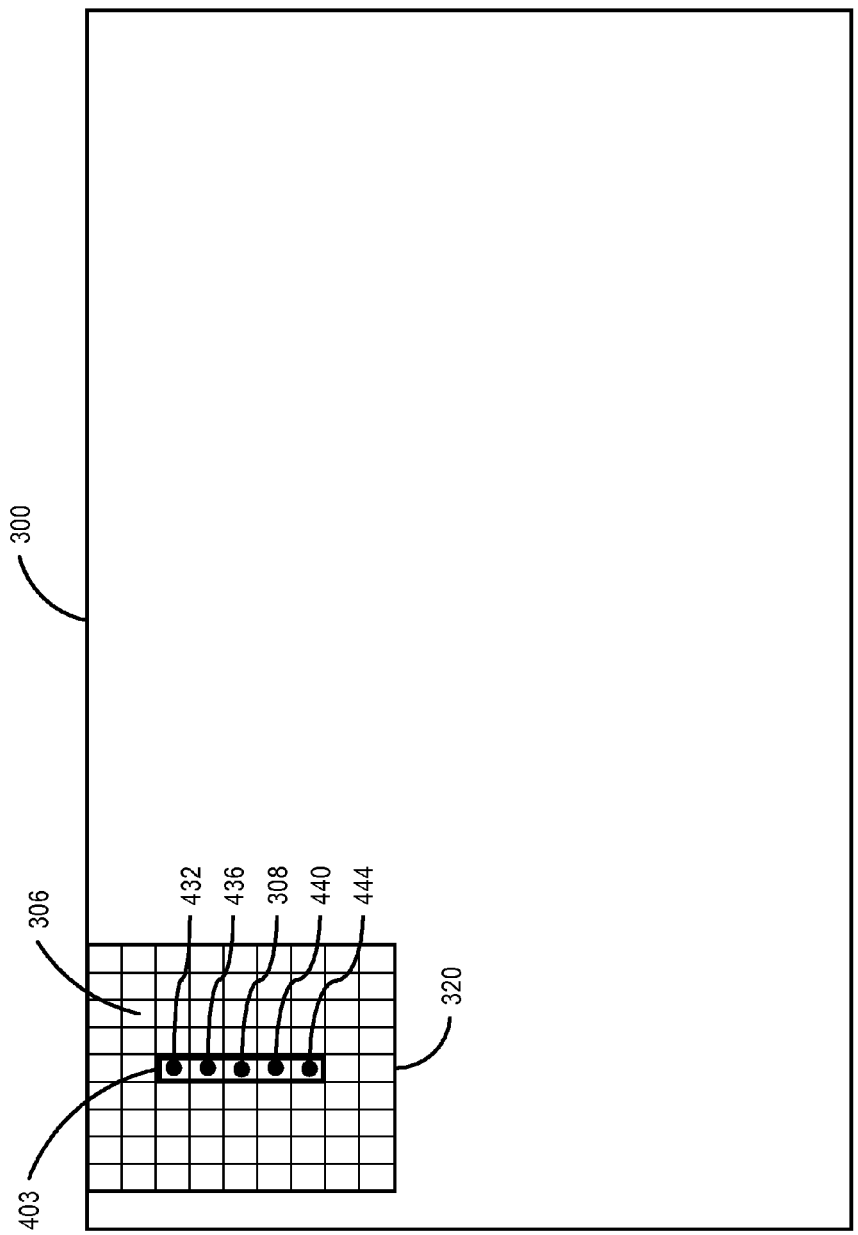

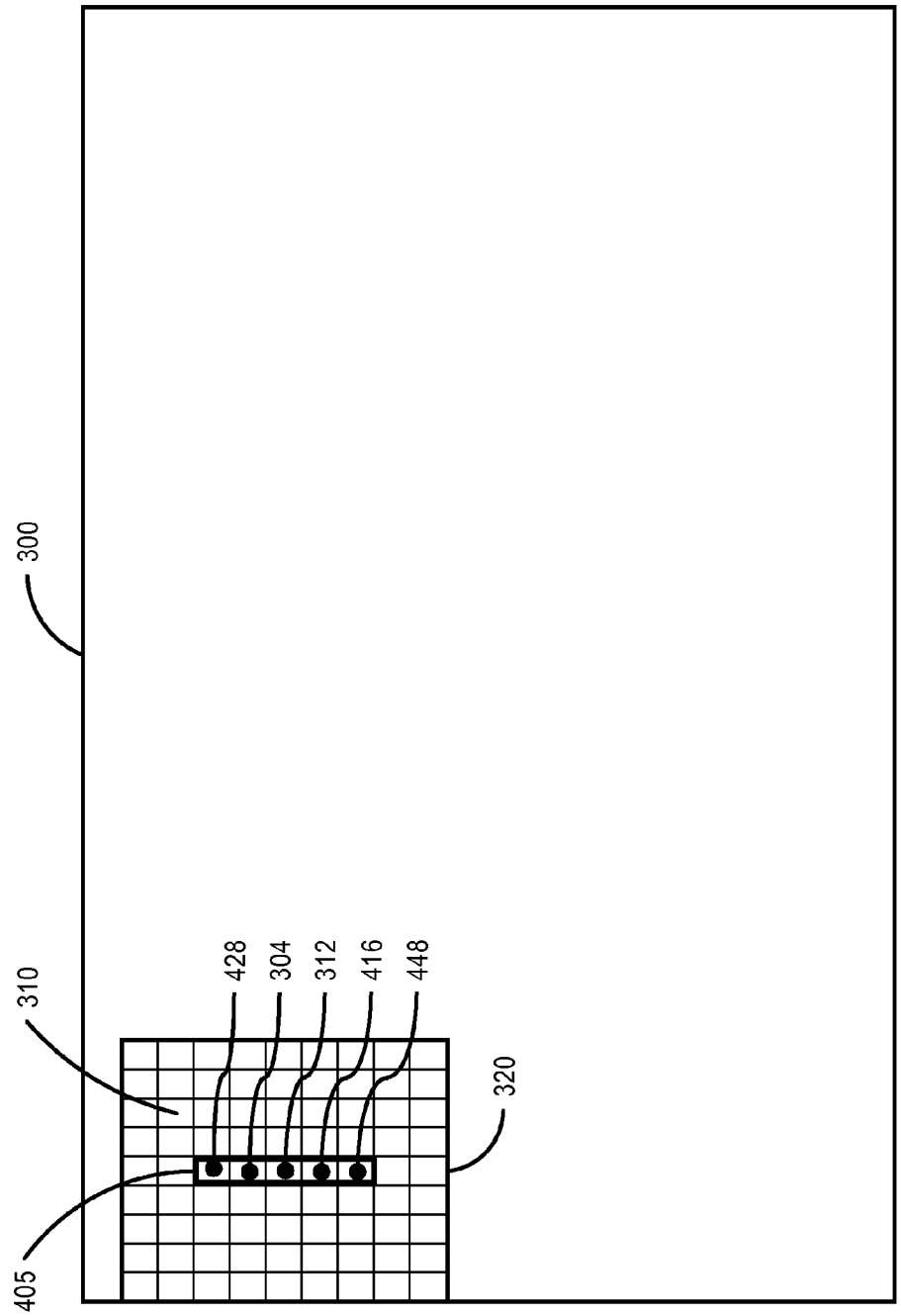

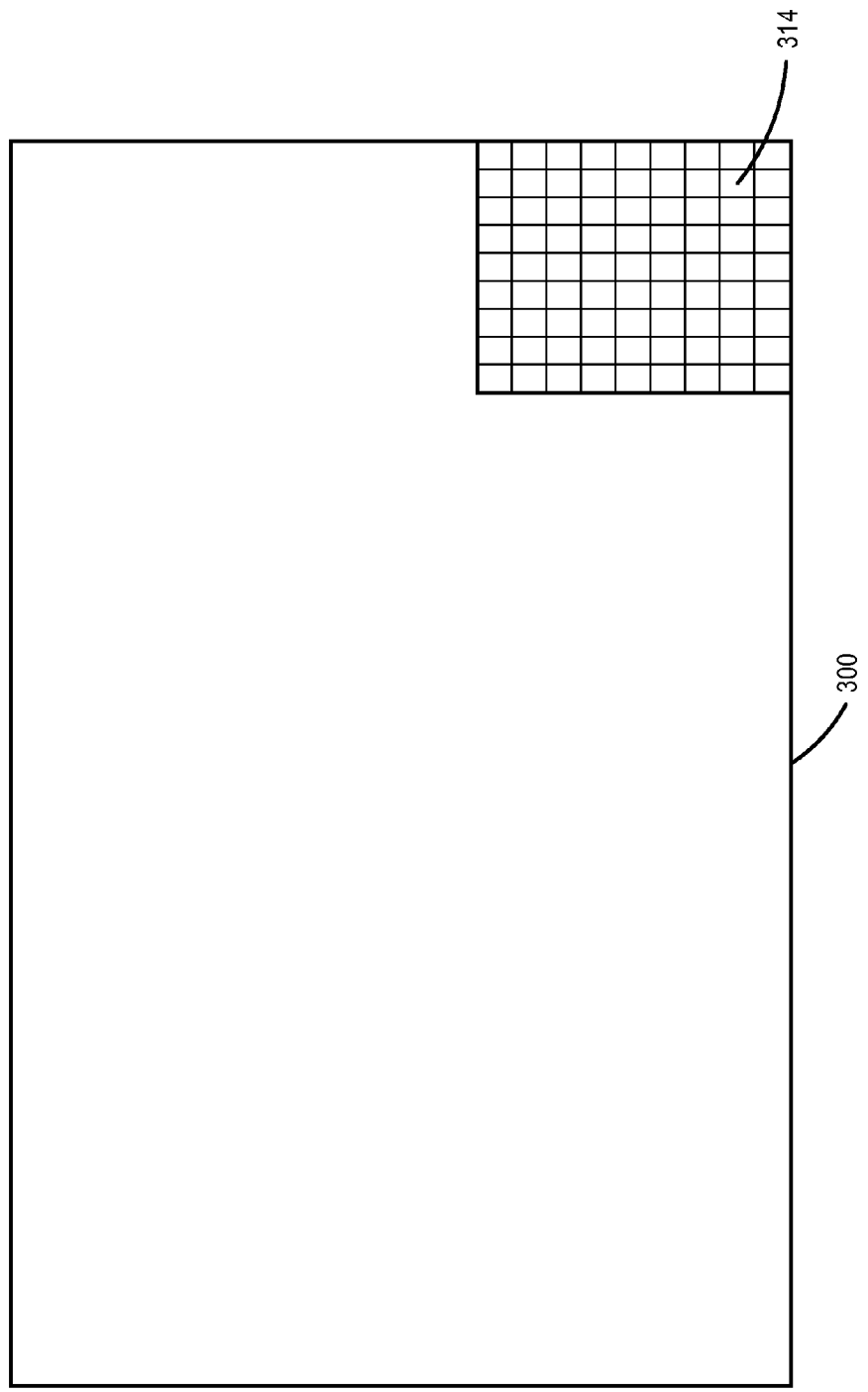

| 1 | 2 | 3 | 4 | 5 | 6 | 7 | 8 | 9 |
|---|---|---|---|---|---|---|---|---|
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | 32 | 33 | 34 | 35 | 36 |
| 37 | 38 | 39 | 40 | 41 | 42 | 43 | 44 | 45 |
| 46 | 47 | 48 | 49 | 50 | 51 | 52 | 53 | 54 |
| 55 | 56 | 57 | 58 | 59 | 60 | 61 | 62 | 63 |
| 64 | 65 | 66 | 67 | 68 | 69 | 70 | 71 | 72 |
| 73 | 74 | 75 | 76 | 77 | 78 | 79 | 80 | 81 |

*Fig. 5*

|   |   |   |   |   |   |   |   |   |
|---|---|---|---|---|---|---|---|---|
| 1 | 10 | 19 | 28 | 37 | 46 | 55 | 64 | 73 |
| 2 | 11 | 20 | 29 | 38 | 47 | 56 | 65 | 74 |
| 3 | 12 | 21 | 30 | 39 | 48 | 57 | 66 | 75 |
| 4 | 13 | 22 | 31 | 40 | 49 | 58 | 67 | 76 |
| 5 | 14 | 23 | 32 | 41 | 50 | 59 | 68 | 77 |
| 6 | 15 | 24 | 33 | 42 | 51 | 60 | 69 | 78 |
| 7 | 16 | 25 | 34 | 43 | 52 | 61 | 70 | 79 |
| 8 | 17 | 26 | 35 | 44 | 53 | 62 | 71 | 80 |
| 9 | 18 | 27 | 36 | 45 | 54 | 63 | 72 | 81 |

|   |   |   |   |   |   |   |   |   |
|---|---|---|---|---|---|---|---|---|
| 1 | 2 | 3 | 4 | 5 | 6 | 7 | 8 | 9 |
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | 32 | 33 | 34 | 35 | 36 |
| 37 | 38 | 39 | 40 | 41 | 42 | 43 | 44 | 45 |
| 46 | 47 | 48 | 49 | 50 | 51 | 52 | 53 | 54 |
| 55 | 56 | 57 | 58 | 59 | 60 | 61 | 62 | 63 |
| 64 | 65 | 66 | 67 | 68 | 69 | 70 | 71 | 72 |
| 73 | 74 | 75 | 76 | 77 | 78 | 79 | 80 | 81 |

702

| 1 | 10 | 19 | 28 | 37 | 46 | 55 | 64 | 73 |
|---|----|----|----|----|----|----|----|----|
| 2 | 11 | 20 | 29 | 38 | 47 | 56 | 65 | 74 |
| 3 | 12 | 21 | 30 | 39 | 48 | 57 | 66 | 75 |
| 4 | 13 | 22 | 31 | 40 | 49 | 58 | 67 | 76 |
| 5 | 14 | 23 | 32 | 41 | 50 | 59 | 68 | 77 |
| 6 | 15 | 24 | 33 | 42 | 51 | 60 | 69 | 78 |
| 7 | 16 | 25 | 34 | 43 | 52 | 61 | 70 | 79 |
| 8 | 17 | 26 | 35 | 44 | 53 | 62 | 71 | 80 |
| 9 | 18 | 27 | 36 | 45 | 54 | 63 | 72 | 81 |

ANISOTROPIC DENOISING METHOD

FIELD OF THE INVENTION

The present invention relates to digital image processing, and more particularly to denoising pixels of a digital image.

BACKGROUND

Many of today's digital image acquisition devices capture a color image using a color filter array (CFA) and an array of optical sensors that is overlaid by the CFA. The CFA has a plurality of filter elements, each of which overlays one of the optical sensors in the optical sensor array, and each filter element is designed to pass only one color of light. The most common type of CFA is the Bayer pattern filter (also referred to as a Bayer filter). The Bayer filter comprises filter elements that pass three different colors of light: green (G), blue (B), and red (R). These filter elements are arranged in alternating rows of green-blue and red-green. With this pattern, red and blue filter elements appear on every other row and every other column, while green filter elements appear on every row and every column. This pattern exploits the human eye's higher sensitivity to green light.

As noted, each filter element passes light of only one color. Thus, in the Bayer filter, a green filter element passes only green light, a blue filter element passes only blue light, and a red filter element passes only red light. This means that an optical sensor behind a green filter element senses only the green portion of the light that hits the green filter element, an optical sensor behind a blue filter element senses only the blue portion of the light that hits the blue filter element, and an optical sensor behind a red filter element senses only the red portion of the light that hits the filter element. Thus, because of the CFA, the image captured by the sensor array is a mosaic image. As used herein, the term mosaic image refers to an image in which there is only partial color information for each pixel of the image. In the case of a mosaic image captured using a Bayer filter, there is only information for one of the three color channels of green, blue, and red for each pixel.

After capturing a mosaic image through the Bayer filter, the array of optical sensors outputs a plurality of values. Each value comes from one of the optical sensors, and each value corresponds to a particular pixel of the image (each optical sensor represents a pixel). Since each pixel corresponds to one of the optical sensors, and since each optical sensor corresponds to one of the filter elements of the Bayer filter, each pixel in turn corresponds to one of the filter elements of the Bayer filter. For each pixel, only one of the three color values is provided by the optical sensor array. This color value will be referred to herein as the sensed pixel value. For example, the sensed pixel value provided by an optical sensor overlaid with a green filter element for a pixel is for the green color channel. Thus, this pixel is referred to as a green pixel. Similarly, the sensed pixel value provided by an optical sensor overlaid with a blue filter element for a pixel is for the blue color channel; thus, this pixel is referred to as a blue pixel. Similarly, the sensed pixel value provided by an optical sensor overlaid with a red filter element is for a red pixel.

In order to render a pixel in full color, a color value is needed for all three of the color channels. Since only one pixel value (corresponding to one of the three color channels) is provided by the sensor array for each pixel, the other two color values need to be derived for each pixel, which means that for each pixel, there is one pixel value and two derived pixel values (corresponding to the other two color channels). A demosaicing process is performed on the mosaic image to calculate the two derived pixel values for each pixel. Through the mosaicing and demosaicing process, a color image can be captured and reproduced.

The sensed pixel values provided by the sensor array may and most likely will include some noise components. These noise components may be due to various factors, such as environmental conditions, manufacturing variations in the optical sensors, etc., and the amount of noise may vary from sensor to sensor. This noise in the sensed pixel values can lead to the introduction of unwanted, spurious colors in the demosaiced image. For example, if the noise in the sensed pixel value for a blue pixel causes the blue component of the pixel to be too high, it may cause the final demosaiced version of that pixel to take on a color that does not reflect the true color of that pixel in the original image. This can lead to a strange and unpleasant image. To prevent this, most image processing systems perform some form of denoising on the mosaic image.

Denoising is often done by averaging the pixel values of nearby pixels on a color channel by color channel basis. For example, a blue pixel of interest may be denoised by taking the pixel values of neighboring blue pixels and averaging them with the pixel value of the blue pixel of interest to derive a denoised pixel value for the blue pixel of interest. A green pixel may be denoised in the same way by taking into account the sensed pixel values of neighboring green pixels, and a red pixel may be denoised by taking into account the sensed pixel values of neighboring red pixels. Thus, pixels are typically denoised on a color channel by color channel basis (in other words, pixels of different colors are denoised separately based on neighboring pixels of the same color).

Some approaches to denoising include isotropic averaging and Gaussian filter averaging. However, while these "global filtering" approaches perform adequately in denoising relatively "uniform" or "flat" areas of an image, these approaches are generally not acceptable denoising strategies for most images since most images contain "edge areas", "line areas", or "detail areas" that would be considerably damaged if these approaches were applied. A "uniform" or "flat" image environment is one in which characteristics of the pixels around a pixel of interest indicate little or no change in the image from one feature to another (e.g., an area of the image depicting a clear sky). An "edge" or "line" image environment is one in which the pixels around the pixel of interest have characteristics that indicate a consistent unidirectional change from one image feature to another (e.g., an area of the image in which there is a change from a parcel box to a table on which the parcel box is placed). A "detail" image environment is one in which the pixels around the pixel of interest have characteristics that indicate many inconsistent multidirectional changes between image features (e.g., an area of the image depicting a floor carpet).

Other approaches such as bilateral filtering and non-local means filtering aim to denoise an image but not at the expense of loosing edges, lines, and details in the image. Generally, these approaches analyze a neighborhood of pixels surrounding a pixel of interest to identify "similar" pixels within the neighborhood. Similar pixels are combined with the pixel of interest in such a way to remove noise from the pixel of interest. The more similar a neighboring pixel is to the pixel of interest, the more the similar pixel is used in denoising the pixel of interest and, hence the more noise that may be reduced from the pixel of interest. However, these approaches are typically computationally intensive and their implementation in hardware would result in a prohibitively high gate count for use in many consumer electronic devices.

What is needed, therefore, is a new, less computationally intensive, approach for effectively denoising an image that preserves edges, lines, and details in the image.

BRIEF DESCRIPTION OF THE DRAWINGS

FIGS. 3A-3D depicts how a window is moved from image portion to image portion to derive denoised pixel values for the pixels in a mosaic image, in accordance with one embodiment of the present invention.

FIGS. 4A-4D depicts how a window is moved from image portion to image portion to derive denoised pixel values for the pixels in a mosaic image, in accordance with one embodiment of the present invention.

FIG. 5 depicts a matrix of pixels that may be processed to derive a denoised pixel values for a central pixel or a central vertical column of pixels, in accordance with one embodiment of the present invention.

FIG. 6 depicts the matrix of pixels of FIG. 5 in which the central vertical column of pixels and a horizontal row of pixels are highlighted, in accordance with one embodiment of the present invention.

FIG. 7A depicts the matrix of pixels of FIG. 5 in which the highlighted pixels are pixels involved in determining difference values for a pixel in question in the vertical column of pixels, in accordance with one embodiment of the present invention.

FIG. 7B depicts the matrix of pixels of FIG. 5 in which the highlighted pixels are pixels involved in determining difference values for a pixel in question in the horizontal row of pixels, in accordance with one embodiment of the present invention.

FIG. 8A depicts the matrix of pixels of FIG. 5 in which the highlighted pixels are pixels involved in determining difference values for a next pixel in question in the vertical column of pixels, in accordance with one embodiment of the present invention.

FIG. 8B depicts the matrix of pixels of FIG. 5 in which the highlighted pixels are pixels involved in determining difference values for a next pixel in question in the horizontal row of pixels, in accordance with one embodiment of the present invention.

DETAILED DESCRIPTION OF EMBODIMENTS

Introduction

Figure 1:
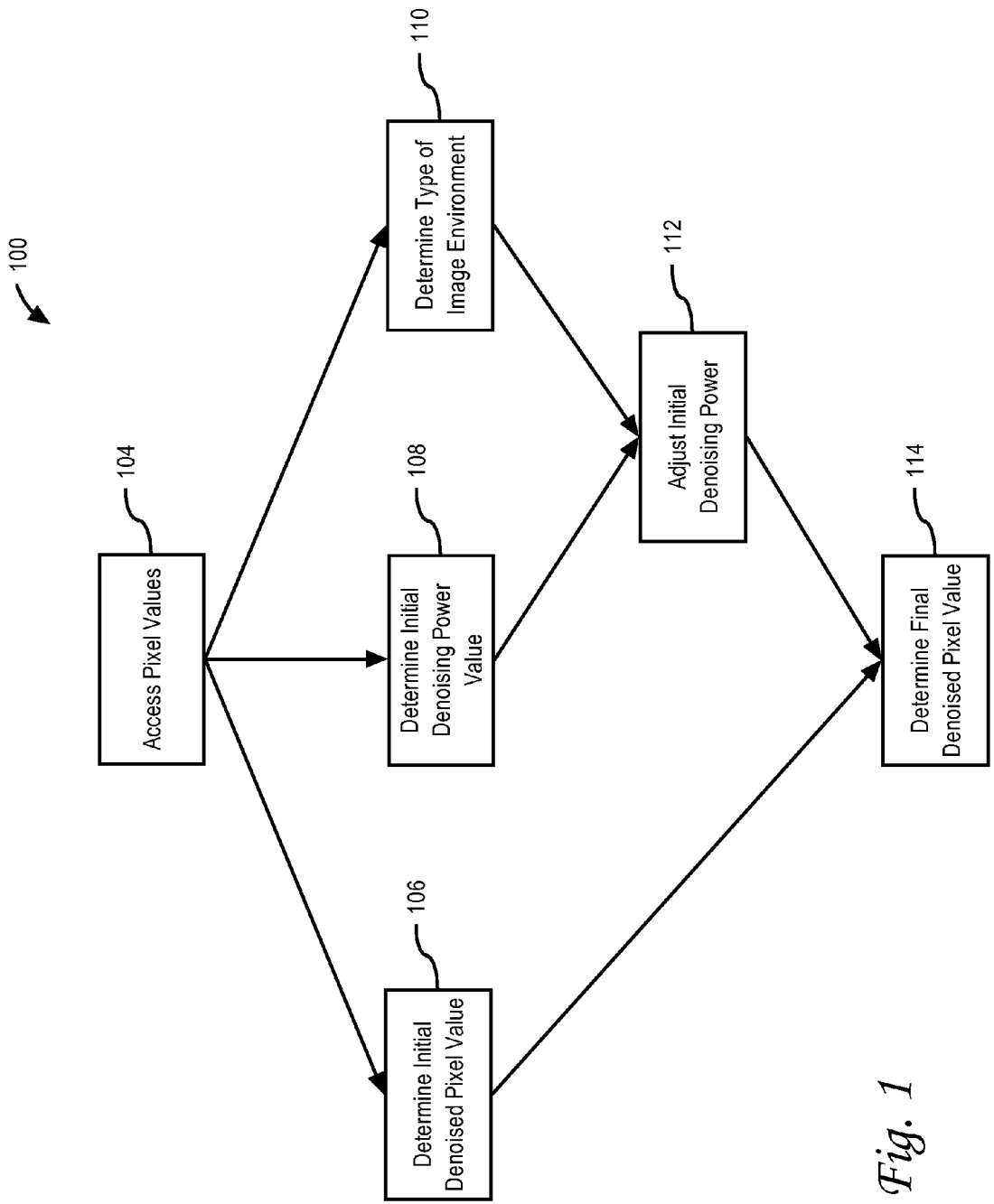
FIG. 1 illustrates a high level flow diagram of the anisotropic denoising method, in accordance with one embodiment of the invention.

The following embodiments are described in sufficient detail to enable those skilled in the art to make and use the invention. It is to be understood that other embodiments would be evident based on the present disclosure, and that system, process, electrical, or mechanical changes may be made without departing from the scope of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Likewise, the drawings showing embodiments of the system are semi-diagrammatic and not to scale and, particularly, some of the dimensions are for the clarity of presentation and are shown greatly exaggerated in the drawing figures. Similarly, although the views in the drawings for ease of description generally show similar orientations, this depiction in the figures is arbitrary for the most part. Generally, the invention can be operated in any orientation.

In addition, where multiple embodiments are disclosed and described having some features in common, for clarity and ease of illustration, description, and comprehension thereof, similar and like features one to another will ordinarily be described with like reference numerals.

In the following description, certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

For expository purposes, the term "horizontal" as used herein is defined as a direction parallel to a border of the digital image, regardless of the digital image's orientation. The term "vertical" refers to a direction perpendicular to the horizontal as just defined. Terms, such as "left", "right", "upper", "lower", "above", and "below" are defined with respect to the horizontal direction.

General Overview

In accordance with an embodiment of the invention, an anisotropic denoising method is provided that removes sensor noise from a digital image while retaining edges, lines, and details in the image. In one embodiment, the method removes noise from a pixel of interest based on the detected type of image environment in which the pixel is situated. If the pixel is situated in an edge/line image environment, then denoising of the pixel is increased such that relatively stronger denoising of the pixel occurs along the edge or line feature. If the pixel is situated in a detail image environment, then denoising of the pixel is decreased such that relatively less denoising of the pixel occurs so as to preserve the details in the image. In one embodiment, detection of the type of image environment is accomplished by performing simple arithmetic operations using only pixels in a 9 pixel by 9 pixel matrix of pixels in which the pixel of interest is situated. As a result, improved image environment sensitive noise reduction is achieved that requires a relatively low gate count in hardware implementations.

FIG. 1 illustrates a high level flow diagram of the anisotropic denoising method, in accordance with one embodiment of the invention. To denoise a pixel, the method begins by accessing (block 104) a plurality of pixel values corresponding to a matrix of pixels. The matrix of pixels represents a portion of a mosaic image captured by an array of optical sensors that has been overlaid by a CFA (the CFA may have a Bayer pattern or some other color pattern), and the pixel values represent sensed pixel values provided by the optical sensors for each of the pixels in the matrix. Since the captured image is a mosaic image, the optical sensors will provide a pixel value for only one of several predetermined colors for each pixel. The matrix has a central pixel and has a central vertical column of pixels that includes the central pixel. In one embodiment, the method produces a final denoised pixel value for the central pixel. In one embodiment, the method produces a final denoised pixel value for each pixel in the central vertical column of pixels. For example, in one embodiment in which the matrix is nine-pixel by nine-pixel (9×9) matrix, the method denoises the central five-pixel by one-pixel (5×1) vertical column of pixels in the 9×9 matrix.

After accessing the plurality of pixel values, the method determines (block 106) an initial denoised pixel value for a given pixel to be denoised. The given pixel is either the central pixel or another pixel in the central vertical column of pixels. In one embodiment, this initial denoised pixel value is determined based at least in part upon a combination of the sensed pixel value for the given pixel and the sensed pixel values for neighboring pixels of the same color channel as the given pixel. Thus, if the given pixel is a blue pixel, then any neighboring pixels combined with the given pixel are also blue pixels. Significantly, when determining the initial denoised pixel value for the given pixel, the extent to which the sensed pixel value of a neighboring pixel is combined with the sensed pixel value for the given pixel, if at all, depends on how similar a pixel region containing the neighboring pixel is to a pixel region containing the given pixel. The more similar the two regions, the more the sensed pixel value for the neighboring pixel is combined with the sensed pixel value for the given pixel when denoising the given pixel. The less similar the two regions, the less the sensed pixel value for the neighboring pixel is combined with the sensed pixel value for the given pixel when denoising the given pixel. If the two regions are sufficiently dissimilar, the sensed pixel value for neighboring pixel may not be combined at all with the sensed pixel value for the given pixel when denoising the given pixel. Thus, the sensed pixel value for a neighboring pixel in one direction with respect to the given pixel (e.g., to the right) may be combined very little or not at all with the sensed pixel value for the given pixel when denoising the given pixel. At the same time, the sensed pixel value for a different neighboring pixel in another direction with respect to the given pixel (e.g., to the left) may be combined heavily with the sensed pixel value for the given pixel when denoising the given pixel. In one embodiment, each pixel region consists of a plurality of adjacent pixels comprising at least one pixel of each color channel in the CFA. For example, with a Bayer CFA, each pixel region may comprise a two-pixel by two-pixel (2×2) "luminance patch" that includes two green pixels, one red pixel, and one blue pixel. Thus, in this embodiment, a determination of similarity between two pixel regions takes into account all of the color channels of the CFA.

Also after accessing the plurality of pixel values, the method determines (block 108) an initial denoising power value for the central pixel. Generally speaking, "denoising power" determines "how much" denoising will be done at a given pixel. In other words, denoising power refers to how much weight the sensed pixel value of the given pixel is allotted when combined with sensed pixel values of neighboring pixels of the same color channel considered to be close enough to the given pixel to be used in denoising the given pixel. In one embodiment, this initial denoising power value is determined according to a non-decreasing function of the current signal level at the central pixel; thus, the initial denoising power value takes into account whether the central pixel is in a low-luminance (i.e., low-light) image environment or high-luminance (i.e., bright-light) image environment.

Also after accessing the plurality of pixel values, the method determines (block 110) an estimation of the type of image environment in which the central pixel is situated based at least in part upon differences in pixel regions along a vertical column of pixels in the matrix of pixels and along a horizontal row of pixels that intersects the vertical column at the central pixel. In one embodiment, the method first estimates the strength of a possible edge feature or line feature on which the central pixel might be situated. If this estimation indicates that the central pixel is likely not situated on an edge or line feature, then the method estimates the extent to which the central pixel is situated in a detail environment of the image (ranging from no/little detail to heavy/chaotic detail).

After determining an estimation of the type of image environment in which the central pixel is situated, the method adjusts (block 112) the initial denoising power value determined for the central pixel based at least in part on the estimation of the type of image environment in which the central pixel is situated to produce a final denoising power for the central pixel. In one embodiment, if the central pixel is situated in a detail image environment, the method decreases the initial denoising power value as a function of a detected amount of detail in the image environment to produce the final denoising power value. In one embodiment, if the central pixel is situated in an edge/line image environment, the method increases the initial denoising power as a function of a detected strength of the edge feature or line feature to produce the final denoising power value. Thus, as the degree of detail surrounding the central pixel increases, the less the given pixel is denoised, thereby preserving details in the image. And as the strength of a detected edge or line feature increases, the more the given pixel is denoised using neighboring pixels on the same side of the edge or line as the given pixel, thereby denoising along the edge or line feature while preserving the edge or line feature itself.

After determining the final denoising power value for the central pixel, the method determines (block 114) a final denoised pixel value for a given pixel based at least in part upon the initial denoised pixel value determined for the given pixel. In one embodiment, the method uses the final denoising power value to select a final denoised pixel value for the given pixel between the initial denoised pixel value (i.e., a maximum amount of denoising of the given pixel based on neighboring pixels of the same color channel as the given pixel) determined for the given pixel and the sensed pixel value (i.e., a minimum amount of denoising or no denoising) for the given pixel. Thus, the amount of denoising performed on a given pixel is dictated by the type of the image environment in which the given pixel is situated.

In an embodiment in which only the central pixel of the matrix is denoised, the method performs each of blocks 106 (determine initial denoised pixel value), 108 (determine initial denoising power), 110 (determine type of image environment), 112 (adjust initial denoising power), and 114 (determine final denoised pixel value) once for the central pixel. In an embodiment in which a central vertical column of pixels is denoised, the method performs each of blocks 108 (determine initial denoising power), 110 (determine type of image environment), and 112 (adjust initial denoising power) once for the central pixel and performs each of blocks 106 (determine initial denoised pixel value) and 114 (determine final denoised pixel value) once for each pixel in the vertical column of pixels.

In the manner described, either a final denoised pixel value is determined for the central pixel or a set of final denoised pixel values are determined for a central vertical column of pixels. These denoised pixel values may be provided as the output of the method. As an alternative, the differences between the final denoised pixel values and the sensed pixel values for the pixels may be provided as the output of the method. Providing the output as a difference allows other components to simply add this difference to their values for the pixels. Either way, the central pixel is denoised by the end of this process and, optionally, the central vertical column of pixels is denoised. To denoise another central pixel or another central pixel column, another matrix of pixels (representing another portion of the mosaic image) with another central pixel and central pixel column is selected, and the process is repeated. By the end of the iterative process, substantially all of the pixels in the mosaic image will have been denoised.

The above discussion provides an overview of the anisotropic denoising method in accordance with one embodiment of the present invention. To facilitate a complete understanding of the invention, a specific sample embodiment will now be described.

Example Image Processing Apparatus

Figure 2:
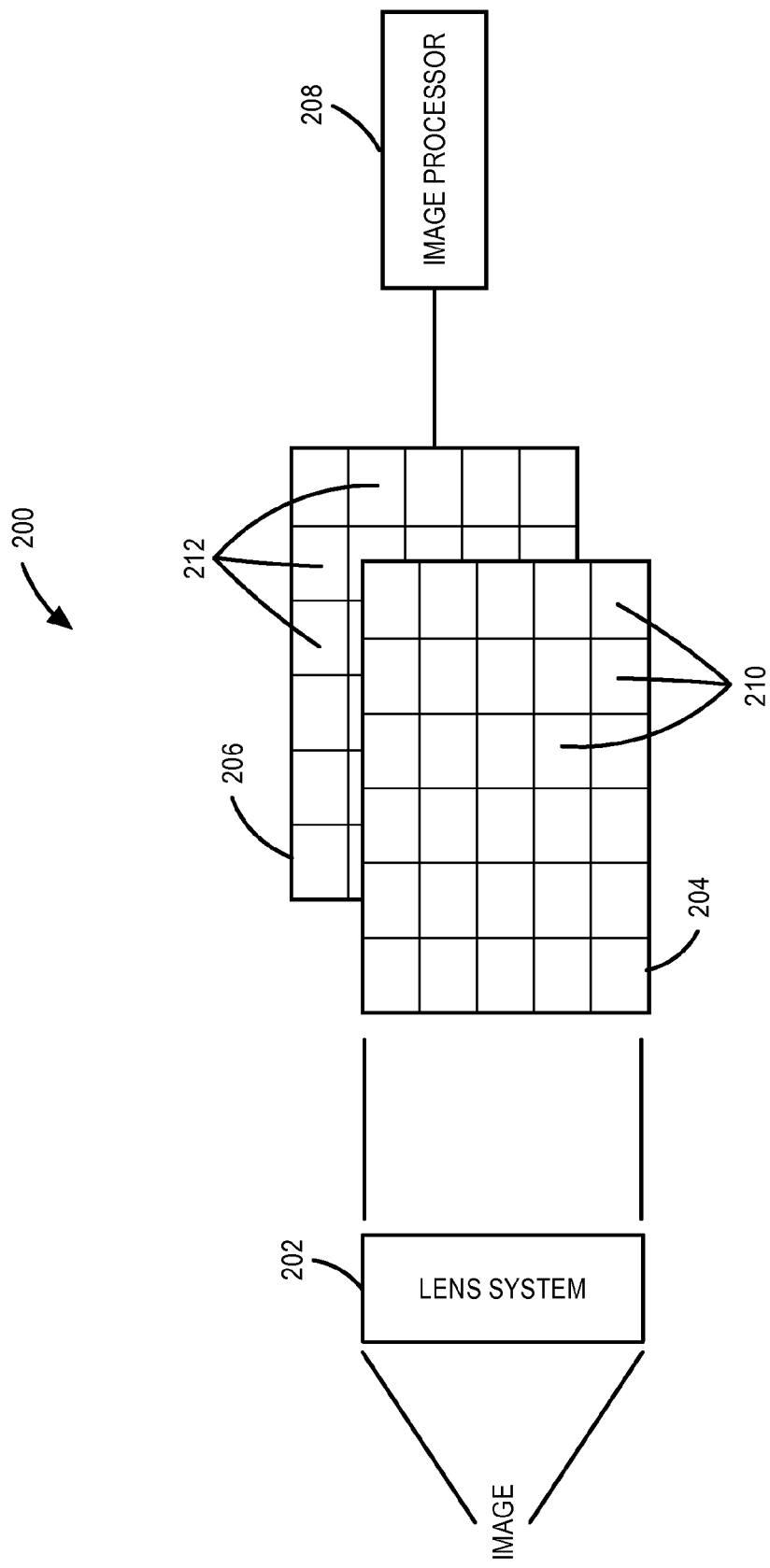
FIG. 2 depicts a possible apparatus in which an embodiment of the present invention may be implemented.

With reference to FIG. 2, there is shown one possible image processing apparatus 200 in which an embodiment of the present invention may be implemented. As shown, the apparatus 200 comprises a lens system 202, a CFA 204, an optical sensor array 206, and an image processor 208.

The lens system 202 receives light from an image to be captured and focuses the light onto the CFA 204. For purposes of the present invention, the lens system 202 may be a simple lens system consisting of just one lens, or it may comprise multiple lenses that work in conjunction with each other. The lens system 202 may be made of any type of suitable lens material, including but not limited to glass and plastic.

The light focused by the lens system 202 is directed at the CFA 204. In one embodiment, the CFA 204 comprises a plurality of filter elements 210 arranged in rows and columns, with each filter element 210 designed to pass light of a particular color. In one embodiment, the CFA 204 takes the form of a Bayer pattern filter that implements the R, G, B color scheme; however, this is not required. For purposes of the present invention, the CFA 204 may be any type of color filter array that uses any set of color filters arranged in any desired pattern.

The light passed through the CFA 204 is detected by the optical sensor array 206. In one embodiment, the optical sensor array 206 comprises a plurality of optical sensor elements 212 arranged in rows and columns that correspond to the rows and columns of filter elements 210 of the CFA 204. Thus, each sensor element 212 is overlaid by a corresponding filter element 210. For purposes of the present invention, the sensor elements 212 may be implemented with any known technology including, but not limited to, charge coupled devices (CCDs) and CMOS sensors.

Together, the CFA 204 and the optical sensor array 206 operate to capture a mosaic image. Specifically, in response to detecting light passed through a corresponding filter element 210, each sensor element 212 provides an output value. This output value indicates the amount of light that was detected by that sensor element 212. Since each sensor element 212 (because of the CFA 204) detects light of only one color, this output value will reflect the intensity of just that color. Thus, the output values provided by the entire array of optical sensors 206 will be a collection of single color values (referred to herein as sensed pixel values), each of which reflects the intensity of just one of several possible colors. As a result, the output of the optical sensor array 206 is a mosaiced version of the original image, referred to herein as a mosaic image. In one embodiment, each optical sensor element 212 represents one of the pixels of the image. This means that, for its corresponding pixel, each optical sensor element 212 provides a color value (a sensed pixel value) for just one of the colors needed to reconstruct that pixel.

The sensed pixel values provided by the optical sensor array 206 are received by the image processor 208. In turn, the image processor 208 may perform any desired operations on the sensed pixel values to enhance the pixel values and to reconstruct a full color image from the pixel values. In one embodiment, it is the image processor 208 that implements the anisotropic denoising method described herein. In addition to denoising, the image processor 208 may also perform a variety of other image processing functions including, but certainly not limited to, demosaicing, chromatic aberration correction, green balancing, etc. For the sake of simplicity, image processor 208 is shown as a single component. However, it should be noted that image processor 208 may be made up of any number of components, and the various components may be interconnected in any desired manner to interact with each other.

For purposes of the present invention, the image processor 208 may be implemented using any known technology. For example, the image processor 208 may be hardware implemented using a device (e.g. a programmable logic array) having a plurality of elements, including logical elements, wherein the elements are programmed/configured to implement the method described herein. As an alternative, the image processor 208 may be hardware implemented by way of another device such as an application specific integrated circuit (ASIC) having elements, including logical elements, that are constructed/configured to implement the method described herein. As a further alternative, the image processor 208 may be software implemented such that the method described herein is set forth in a set of instructions that are stored in a machine readable storage medium and executed by one or more computing devices (such as the sample computing device shown in FIG. 12) to carry out the method described herein. These and other implementations are possible. All possible implementations are within the scope of the present invention.

Specific Example of an Anisotropic Denoising Method

To illustrate how the method in accordance with one embodiment of the present invention may be applied to achieve anisotropic noise reduction, a specific example will now be described. In the following example, it will be assumed for the sake of illustration that a Bayer filter implementing the RGB color scheme is used as the CFA 204 to capture a mosaic image, and that it is the mosaic image that is being denoised by the image processor 208. It should be noted that the use of a Bayer filter is not required; if so desired, other CFAs implementing other color schemes may also be used to capture the mosaic image.

Anisotropic Denoising an Overall Mosaic Image (Central Pixel Only)

In one embodiment, the image processor 208 denoises a mosaic image by denoising a central pixel of a selected portion of the mosaic image at a time. This is shown in FIGS. 3A-D. The portion of the overall mosaic image 300 that is currently being processed is defined by a window 320. In one embodiment, this window 320 encompasses a 9×9 matrix of pixels (note: 9×9 is used just as an example; other dimensions (e.g. 11×11, 11×13, etc.) may be used if so desired). Initially, the image processor 208 positions the window 320 in the uppermost left corner of the mosaic image 300. This causes a first image portion 302 to be selected. This image portion 302 has a corresponding central pixel 304. The image processor 208 processes the pixels in the selected image portion 302 to determine a final denoised pixel value for the central pixel 304.

Figure 3B:
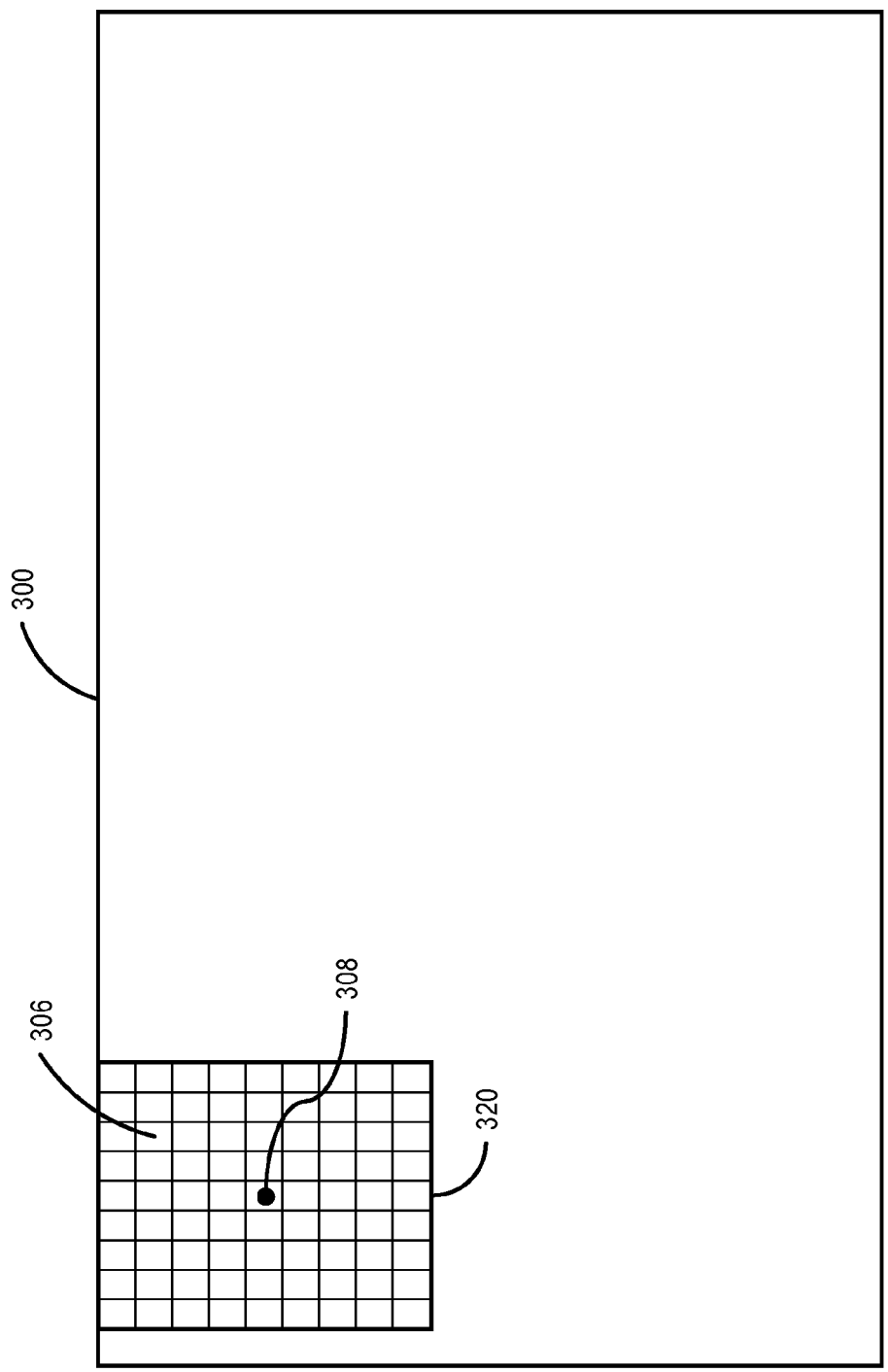

As shown in FIG. 3B, the image processor 208 then shifts the window 320 one pixel to the right to give rise to another image portion 306 having another corresponding central pixel 308. The image processor 208 processes the pixels in this image portion 306 to determine a final denoised pixel value for the central pixel 308. The image processor 208 continues this process of shifting the window 320 one pixel to the right and determining a final denoised pixel value for a central pixel until the window 320 reaches the end of the row.

At that point, as shown in FIG. 3C, the image processor 208 shifts the window 320 back to the left and down one pixel to give rise to another image portion 310 having another corresponding central pixel 312. The image processor 208 processes the pixels in this image portion 310 to determine a final denoised pixel value for the central pixel 312.

Figure 3D:
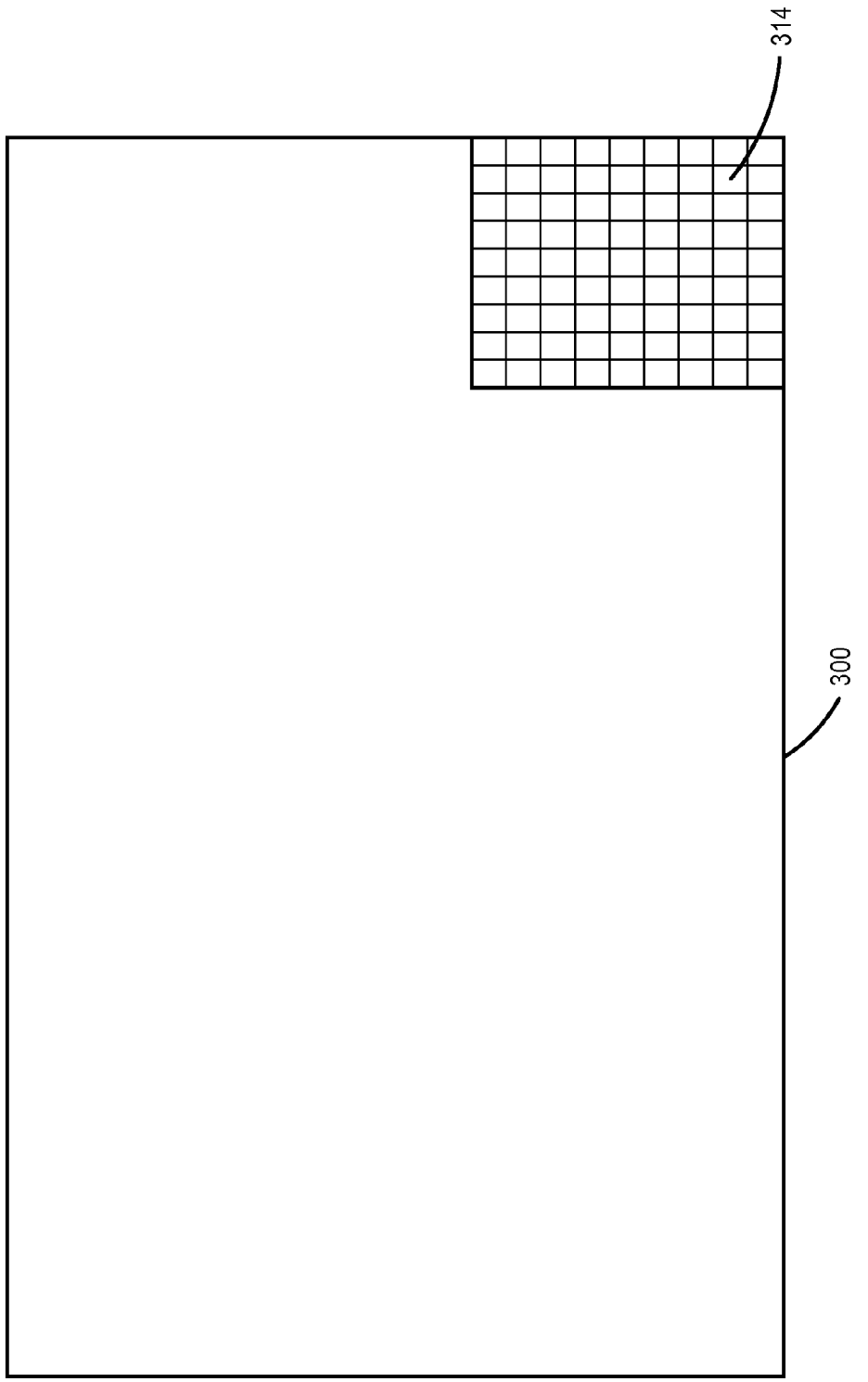

As shown in FIG. 3D, the image processor 208 continues this process of shifting the window 320 to the right and then down until the window 320 eventually reaches the image portion 314 in the lowermost right corner of the mosaic image 300. At that point, the image processor 208 will have determined a final denoised pixel value for all of the pixels in the mosaic image 300 except for the relatively few pixels along the edges. In this manner, the mosaic image 300 is denoised.

Anisotropic Denoising an Overall Mosaic Image (Central Vertical Column of Pixels)

In another embodiment, the image processor 208 denoises a mosaic image by denoising a central vertical column of pixels of a selected portion of the mosaic image at a time. This is shown in FIGS. 4A-D. The portion of the overall mosaic image 300 that is currently being processed is defined by a window 320. In one embodiment, this window 320 encompasses a 9×9 matrix of pixels (note: 9×9 is used just as an example; other dimensions (e.g. 11×11, 11×13, etc.) may be used if so desired) and a 5×1 central vertical column 401 of pixels (note: 5×1 is just as an example; other dimensions (e.g., 7×1) may be used if so desired).

Initially, the image processor 208 positions the window 320 in the uppermost left corner of the mosaic image 300. This causes a first image portion 302 to be selected. This image portion 302 has a corresponding central pixel 304, one or more pixels 424, 428, etc., directly vertically above the central pixel 304 in the vertical column of pixels 401, and one or more pixels 312, 416, etc., directly vertically below the central pixel 304 in the vertical column 401.

In one embodiment, the image processor 208 processes the pixels in the selected image portion 302 to determine an "optimal" final denoised pixel value for the central pixel 304 and "nearly optimal" final denoised pixel values for the other pixels 424, 428, 312, 416, etc., in the vertical column 401. The other pixels in the vertical column are said to be only "nearly optimally" denoised because their final denoised pixels value are derived based on a final denoising power value determined for the central pixel.

As shown in FIG. 4B, the image processor 208 then shifts the window 320 one pixel to the right to give rise to another image portion 306 having another corresponding central pixel 308, another one or more pixels 432, 436, etc. directly vertically above the central pixel 308 in another vertical column of pixels 403, and another one or more pixels 440, 444, etc. directly vertically below the central pixel 308 in the vertical column 403. The image processor 208 processes the pixels in this image portion 306 to derive an "optimal" final denoised pixel value for the central pixel 308 and "nearly optimal" final denoised pixel values for the other pixels 432, 436, 440, 440, etc., in the vertical column 403. The image processor 208 continues this process of shifting the window 320 one pixel to the right and determining final denoised pixel values for a central vertical column of pixels 401, 403, etc., until the window 320 reaches the end of the row.

As the window 320 is shifted along the row in this manner, the image processor 208 successively produces vertical columns of denoised pixels 401, 403, etc. These columns may be collected and provided by the image processor 208 as a sub-matrix of denoised pixels to other image processing modules (e.g., sharpening, auto-focus, demosaicing, etc.) of the image processor 208 that process portions 304, 306, etc., of the image. Significantly, these other image processing modules can process portions of the image in which more than just the central pixel has been denoised. In the embodiment depicted in FIGS. 4A-D, a 5×5 sub-matrix of denoised pixels up to a 5×9 sub-matrix of denoised pixels can be provided to other image processing modules. For example, an image processing module processing image portion 302 of FIG. 4A can be provided with a 5×5 sub-matrix of denoised pixels after the image processor 208 has produced the first five 5×1 vertical columns of denoised pixels. For image portion 306 of FIG. 4B, a 5×6 sub-matrix can be provided. For image portions in the middle of a row, a 5×9 sub-matrix can be provided. At the end of the row, like the beginning of the row, a 5×5 sub-matrix can be provided.

Providing sub-matrices of denoised pixels to other image processing modules in this manner is especially useful in facilitating efficient pipelined image processing in the image processor 208. In particular, other image processing modules (e.g., sharpening, auto-focus, demosaicing, etc.) in the image processor 208 can begin processing substantially denoised portions of the image while the denoising window 320 is still in the first row of the image. In contrast, when only the central pixel of each portion is denoised, other image processing modules cannot process a substantially denoised portion of the image until the denoising window 320 has been shifted across and down multiple rows. Further, since the image portions provided to other image processing modules have a substantial portion of the pixels denoised (e.g., a 5×5 sub-window up to a 5×9 sub-window of each 9×9 image portion), the other image processing is performed on the mosaic image substantially as if the entire mosaic image has been denoised before being provided to the other image processing modules.

As mentioned above, the image processor 208 continues the process of shifting the window 320 one pixel to the right and determining denoised pixel values for a central vertical column of pixels 401, 403, etc. until the window 320 reaches the end of the row. At that point, as shown in FIG. 4C, the image processor 208 shifts the window 320 back to the left and down one pixel to give rise to another image portion 310 having another corresponding central pixel 312, another one or more pixels 428, 304, etc. directly vertically above the central pixel 312 in another vertical column of pixels 405, and another one or more pixels 416, 448, etc. directly vertically below the central pixel 312 in the vertical column of pixels 405. The image processor 208 processes the pixels in this image portion 310 to determine an "optimal" final denoised pixel value for the central pixel 312 and "nearly optimal" final denoised pixel values for the other pixels 428, 304, 416, 448, etc. in the vertical column 405.

The image processor 208 continues this process of shifting the window 320 to the right and then down until the window 320 eventually reaches the image portion 314 in the lowermost right corner of the mosaic image 300. Note that while all but one of the pixels in a vertical column that were denoised when denoising an image portion may also be denoised when denoising the image portion one pixel below that portion, only one pixel is "optimally" denoised by the image processor 208 when denoising a particular portion. For example, in the embodiment depicted in FIGS. 4A-D, when denoising image portion 302, the image processor 208 optimally denoises the central pixel 304 and nearly optimally denoises pixels 428, 312, and 416. When denoising image portion 410, which is one-pixel vertically below portion 402, the image processor 208 optimally denoises then central pixel 312 and nearly optimally denoises pixels 428, 304, and 416. Nonetheless, when the window 320 eventually reaches the image portion 314 in the lowermost right corner of the mosaic image 300, the image processor 208 will have determined an "optimal" final denoised pixel value for all of the pixels in the mosaic image 300 except for the relatively few pixels along the edges. In this manner, the mosaic image 300 may be denoised.

Anisotropic Denoising of Pixels in a Matrix of Pixels

The following discussion describes how a central pixel may be denoised and, optionally, how a central vertical column of pixels may be denoised, once the window 320 has been positioned and an image portion (comprising a matrix of pixels) has been selected. To facilitate discussion, the matrix of pixels (which is a 9×9 matrix having a 5×1 central vertical column of pixels in the current example) encompassed by window 320 is shown in FIG. 5, wherein the 81 pixels are numbered in order from left to right and from top to bottom. The central pixel of the matrix is pixel 41. The 5×1 central vertical column of pixels includes pixels 23, 32, 41, 50, and 59. Since the matrix shown in FIG. 5 represents any possible matrix of pixels encompassed by the window 320, the central pixel may be one of the multiple color channels of the CFA. For example, if the CFA is a Bayer filter, the central pixel may be a red, blue, or green pixel. Further, each pixel in the matrix is of the same color channel as every other pixel in its row and every other pixel in its column. For example, if pixel 41 is a red pixel, then pixels 37, 39, 43, 45, etc., and pixels 5, 23, 59, and 77, etc., are also red pixels.

Final Denoised Pixel Value

To denoise a given pixel in the central vertical column of pixels, the image processor 208 determines a final denoised pixel value for the given pixel. This determination is based at least in part upon an initial denoised pixel value determined for the given pixel, an adjusted denoising power value determined for the central pixel, and an original pixel value for the given pixel.

In one embodiment, the image processor 208 determines the original pixel value for the given pixel based upon the current value of the given pixel when the image portion comprising the matrix of pixels is selected for denoising. Thus, the original pixel value for the given pixel represents no amount of denoising of the given pixel. For example, the original pixel value for the given pixel may be the given pixel's sensed pixel value.

Using the original pixel value for the given pixel, the initial denoised pixel value for the given pixel, and the adjusted denoising power value for the central pixel, the image processor 208 proceeds to determine a final denoised pixel value, $V_{final}$, for the given pixel. In one embodiment, $V_{final}$ is determined using the following equation:

$$V_{final} = SIGN(V_{initial} - V_{original}) * (P_{adjusted} * ABS(V_{initial} - V_{original}) + 32)/64 + V_{original} \quad \text{(Eq. 1)}$$

In equation 1, $V_{initial}$ is the initial denoised pixel value determined for the given pixel. $V_{original}$ is the original pixel value for the given pixel. $P_{adjusted}$ is the adjusted denoising power determined for the central pixel. Thus, the final denoised pixel value for the given pixel, $V_{final}$, is the linear interpolation between the original pixel value for the given pixel, $V_{original}$, and the initial denoised pixel value for the given pixel, $V_{initial}$, based on the adjusted denoising power determined for the central pixel, $P_{adjusted}$.

Significantly, in equation 1, a relatively higher adjusted denoising power value, $P_{adjusted}$, results in a final denoised pixel value, $V_{final}$, for the given pixel that is closer to the initial denoised pixel value, $V_{initial}$, for the given pixel. In one embodiment, the initial denoised pixel value, $V_{initial}$, for the given pixel represents the maximum amount of denoising to be performed on the given pixel taking into account how pixel regions in different directions surrounding the given pixel differ from pixel regions containing the given pixel. In contrast, a relatively lower adjusted denoising power value, $P_{adjusted}$, results in a final denoised pixel value, $V_{final}$, for the given pixel that is closer to the original pixel value, $V_{original}$, for the given pixel (i.e., the minimal amount of denoising to be performed on the given pixel).

As mentioned above, the adjusted denoising power value, $P_{adjusted}$, is determined in one embodiment based on the type of image environment in which the central pixel is situated (e.g., edge/line or detail). Thus, a significant point with regard to equation 1 is that if the central pixel is situated on a strong edge or line feature of the digital image, then maximum denoising of the given pixel occurs along the edge or line feature but not perpendicular to the edge or line feature so as to preserve the edge or line feature in the image. And if the central pixel is situated in a detailed image environment, then minimal denoising of the given pixel occurs so as to preserve the details in the image.

Equation 1 is but one example of an equation that may be used to determine a final denoised pixel value for the given pixel and the invention is not limited to any particular equation for determining a final denoised pixel value for the given pixel. Other equations may be used, if so desired. For example, other equations may be used that select a final denoised pixel value for the given pixel between an initial denoised pixel value for the given pixel and an original pixel value for the given pixel.

Initial Denoised Pixel Value

In one embodiment, the image processor 208 determines the initial denoised pixel value, $V_{initial}$, for the given pixel that represents a maximum amount of denoising to be performed on the given pixel. As noted above, less denoising of the given pixel may actually be performed based on the adjusted denoising power, $P_{adjusted}$, determined for the central pixel.

In one embodiment, the image processor 208 determines the initial denoised pixel value, $V_{initial}$, for the given pixel based at least in part upon a weighted averaging of the original pixel value for the given pixel and original pixel values of neighboring pixels of the same color channel as the given pixel. For example, referring to the matrix of FIG. 5, if the given pixel is pixel 32, then, according to one embodiment, the image processor 208 determines the initial denoised pixel value, $V_{initial}$, for pixel 32 based on a weighted averaging of the original pixel value for pixel 32 and the original pixel values of pixels 14, 30, 50, and 34.

According to one embodiment, when averaging the original pixel values of the given pixel and the neighboring pixels, weights are assigned based on how similar pixel regions containing the neighboring pixels are to pixel regions containing the given pixel. In particular, more of the original pixel value of a neighboring pixel of the same color channel is averaged with the original pixel value for the given pixel as the similarity between a neighboring pixel region containing the neighboring pixel and a pixel region containing the given pixel region increases. In other words, the more similar the two regions, the more the neighboring pixel is used in denoising the given pixel. If the neighboring pixel region is sufficiently dissimilar from the given pixel region, then the neighboring pixel may not be used at all in denoising the given pixel.

In one embodiment, the image processor 208 uses a difference threshold value determined for the central pixel to determine the maximum extent a neighboring pixel region can differ from a pixel region containing the given pixel and still be used in denoising the given pixel. As a result, a neighboring pixel in one direction with respect to the given pixel (e.g., to the left of the given pixel) may be used very little or not at all in denoising the given pixel depending on how similar the neighboring region is to the given pixel region while another neighboring pixel in another direction (e.g., to the right of the given pixel) may be used heavily in denoising the given pixel. Thus, the difference threshold value determined for the central pixel contributes to the anisotropic nature of the denoising method performed by the image processor 208. Determining the different threshold value for the central pixel is discussed in greater below.

In one embodiment, four pixel regions neighboring the given pixel are used in determining the initial denoised pixel value for the given pixel: one pixel region above the given pixel, one pixel region below the given pixel, one pixel region to the left of the given pixel, and one pixel region to the right of the given pixel. For example, referring again to the matrix of FIG. 5, if the given pixel is pixel 32, then, according to one embodiment, the above pixel region comprises pixels 14, 15, 23, and 24; the below pixel region comprises pixels 41, 42, 50, and 51, the left pixel region comprises pixels 21, 22, 30, and 31, and the right pixel region comprises pixels 24, 25, 33, and 34.

In one embodiment, the image processor 208 determines the initial denoised pixel value, $V_{initial}$, for the given pixel by performing the following operations.

Initially, the image processor 208 determines a difference indicator score for each of the neighboring pixel regions. Each difference indicator score provides a "soft" inequality indicating whether and to what extent a pixel of the same color channel in the neighboring pixel region can be of aid in denoising the given pixel. For example, according to one embodiment, each difference indicator score has a value of zero, one, two, or three. A difference indicator score of one indicates that the neighboring pixel can be of aid in denoising the given pixel. A difference indicator score of two indicates that the neighboring pixel can be of less aid in denoising the given pixel. A difference indicator score of three indicates that the neighboring pixel can be yet less aid in denoising the given pixel. A difference indicator score of zero indicates that the neighboring pixel can be of no aid in denoising the given pixel.

After determining the difference indicator scores for the neighboring pixel regions, the image processor 208 determines a weighted denoised pixel value for each neighboring pixel region based at least in part upon the difference indicator score determined for the neighboring pixel region, the original pixel value for the given pixel, and the original pixel value of a pixel in the neighboring pixel region of the same color channel as the given pixel. Using the weighted denoised pixel values, the image processor 208 proceeds to determine an initial denoised pixel value, $V_{initial}$, for the given pixel. In one embodiment, $V_{initial}$ is determined using the following equation:

$$V_{initial} = (15 * (W_{left} + W_{right} + W_{above} + W_{below}) - 28 * V_{original} + 16)/32 \quad \text{(Eq. 2)}$$

In equation 2, $V_{original}$ is the original pixel value for the given pixel (e.g., pixel 32) and $W_{left}$, $W_{right}$, $W_{above}$, $W_{below}$ are the weighted denoised pixel values determined for left, right, above, and below pixel regions neighboring the given pixel. Significantly, the weighted denoised pixel values can be the original pixel values of pixels (e.g., pixels 14, 30, 50, and 34) of the same color channel as the given pixel (e.g., pixel 32) in the neighboring pixel regions, or some linear combination of these original pixel values. In some situations such as, for example, when the given pixel is situated in an extremely detailed or chaotic image environment, each of the weighted denoised pixel values may be the original pixel value of the given pixel itself. In these situations, the initial denoised pixel value, $V_{initial}$, for the given pixel may be the original pixel value, $V_{original}$, for the given pixel.

In one embodiment, the image processor 208 determines each weighted denoised pixel value based on the difference indicator scores determined for the neighboring pixels regions such that the more the difference indicator score for a neighboring pixel region indicates that the neighboring pixel region would be of aid in denoising the given pixel, the more the original pixel value of a same color channel pixel in the neighboring pixel region is incorporated into the weighted denoised pixel value for that neighboring pixel region. For example, in one embodiment, the weighted denoised pixel value for a neighboring pixel region is determined as follows:

If the difference indicator score for a neighboring pixel region indicates that the neighboring pixel region would be of little to no aid in denoising the given pixel (i.e., the difference between the two regions is sufficiently large), then the weighted denoised pixel value for the neighboring region is determined as the original pixel value of the given pixel without incorporating any of the original pixel value of a same color channel pixel in the neighboring pixel region into the weighted denoised pixel value.

Else the original pixel value of a same color channel pixel as the given pixel in the neighboring pixel region is incorporated into the weighted denoised pixel value as a function of how close the two regions are to each other.

For example, in one embodiment, a weighted denoised pixel value in the case where the two regions are sufficiently close is determined according to the following equations:

$$M_x = (V_{original} + V_{neighboring})/2 \quad \text{(Eq. 3)}$$

$$W_x = ((DI_x - 1) * (V_{original} - M_x) + 4 * M_x + 2)/4 \quad \text{(Eq. 4)}$$

In equations 3 and 4, $V_{original}$ is the original pixel value for the given pixel. $V_{neighboring}$ is the original pixel value of a same color channel pixel in the neighboring pixel region in question. $M_x$ is an arithmetic mean of the original pixel value, $V_{original}$, for the given pixel and the original pixel value, $V_{neighboring}$, of a same color channel pixel in the neighboring pixel region in question. $DI_x$ is the difference indicator score determined for the neighboring pixel region in question. $W_x$ is the weighted denoised pixel value for the neighboring pixel region in question.

The significant point regarding equations 3 and 4 is that as the similarity, according to the difference indicator score, $DI_x$, between the neighboring pixel region and a region containing the given pixel decreases, the weighted denoised pixel value, $W_x$, is pushed towards the original pixel value, $V_{original}$, for the given pixel. Conversely, as the similarity increases, the weighted denoised pixel, $W_x$, is pushed towards the average, $M_x$, of the original pixel value, $V_{original}$, for the given pixel and the original pixel value, $V_{neighboring}$, for a same color channel pixel in the neighboring pixel region. In other words, the more similar the two regions, the more the given pixel is denoised by a same color channel pixel in the neighboring pixel region. Conversely, the less similar the two regions, the less the given pixel is denoised by that pixel.

Equations 2, 3, and 4 are but one example of a set of equations that may be used to determine an initial denoised pixel value for the given pixel and the invention is not limited to any particular equation or any particular set of equations for determining an initial denoised pixel value for the given pixel. Other equations may be used, if so desired. For example, other equations may be used that determine an initial denoised pixel value for the given pixel based on a weighted averaging of the given pixel with neighboring pixels of the same color channel as the given pixel.

Adjusted Denoising Power Value

In one embodiment, the image processor 208 adjusts an initial denoising power value determined for the central pixel based at least in part on an estimation of the type of image environment in which the central pixel is situated to produce the adjusted denoising power, $P_{adjusted}$, for the central pixel. In one embodiment, if the central pixel is situated in a detail image environment, the image processor 208 decreases the initial denoising power value as a function of a detected amount of detail in the image environment to produce the adjusted denoising power value, $P_{adjusted}$, for the central pixel. In one embodiment, if the central pixel is situated on an edge/line image, the image processor 208 increases the initial denoising power as a function of a detected strength of the edge feature or line feature to produce the adjusted denoising power value, $P_{adjusted}$, for the central pixel. Thus, as the degree of detail surrounding the central pixel increases, the less the given pixel is denoised, thereby preserving details in the image. And as the strength of a detected edge or line feature increases, the more the given pixel is denoised using neighboring pixels of same color channel pixels on the same side of the edge or line feature as the given pixel, thereby denoising more strongly along the edge or line feature (and denoising weakly or not at all perpendicularly to the edge or line feature) such that the edge or line feature is preserved in the final image.

In one embodiment, the adjusted denoising power value, $P_{adjusted}$, for the central pixel is determined using one of the following equations:

$$P_{adjusted} = P_{initial} + \text{SIGN}(U_{detail}) * (S_{detail} * \text{ABS}(U_{detail}) + 8)/16 \quad \text{(Eq. 5)}$$

$$P_{adjusted} = P_{initial} + (S_{edge} * U_{edge})/32 \quad \text{(Eq. 6)}$$

In the embodiment, equation 5 is used to determine the adjusted denoising power, $P_{adjusted}$, for the central pixel if the estimation of the type of image environment in which the central pixel is situated indicates that the central pixel is situated in a detail image environment. On the other hand, if the estimation indicates that the central pixel is situated on an edge/line image, then equation 6 is used. $U_{detail}$ is a user-specified parameter specifying an amount of power change in the event of a detail/uniform environment. $U_{edge}$ is a user-specified parameter specifying an amount of power change in the event of an edge/line image environment.

Generally, it is expected, but not required, that $U_{edge}$ will be a positive number so that along edge or line features, the denoising power will increase and denoising will be strong. Accordingly, it is expected, but not required, that $U_{detail}$ will be a negative number so that within a detailed image environment, the denoising power will decrease, and details in the image will not be lost by the denoising process.

$P_{initial}$ is the initial denoising power determined for the central pixel.

$S_{detail}$ indicates how much detail is around the central pixel in the image. In one embodiment, $S_{detail}$ is a non-negative number ranging from 0 to 16 with 0 indicating little or no detail around the central pixel and 16 indicating heavy or chaotic detail around the central pixel. Other ranges may be used, if so desired. Significantly, as the degree of detail around the central pixel increases, more of $U_{detail}$ (which is preferably a negative number) is added back to the initial denoising power, $P_{initial}$, for the central pixel. Note that in a flat or uniform image environment where $S_{detail}$ should be small, $P_{adjusted}$ will equal or approximately equal $P_{initial}$.

$S_{edge}$ indicates the strength of the edge or line feature in the image. In one embodiment, $S_{edge}$ is a positive number ranging from 1 to 32 with 1 indicating a weak edge and 32 indicating a strong strictly vertical or strictly horizontal edge or line. Other ranges may be used, if so desired. Significantly, as the strength of the detected edge or line feature increases, more of $U_{edge}$ is added to the initial denoising power, $P_{initial}$, for the central pixel.

Once the image processor 208 has determined the adjusted denoising power, $P_{adjusted}$, for the central pixel, the image processor 208 is able to determine final denoised pixel values for the central pixel and, optionally, the pixels in the central vertical column of pixels.

Equations 5 and 6 are but one example of a set of equations that may be used to determine an adjusted denoising power value for the central pixel and the invention is not limited to any particular equation or any particular set of equations for determining an adjusted denoising power value for the central pixel. Other equations may be used, if so desired. For example, other equations may be used that determine an adjusted denoising power value for the central pixel that increase an initial denoising power value to produce the adjusted denoising power value when the central pixel is situated on an edge/line image and that decrease the initial denoising power value to produce the adjusted denoising power value when the central pixel is situated in a detail environment.

Estimating the Type of Image Environment

According to one embodiment, the estimation of the type of image environment in which the central pixel is situated is represented by $S_{edge}$ and $S_{detail}$ above. $S_{edge}$ indicates the strength of a possible edge or line feature on which the central pixel is situated. $S_{detail}$ indicates the amount of detail around the central pixel in the image in the event $S_{edge}$ indicates no edge or line feature is present. In one embodiment, $S_{edge}$ is a non-negative number ranging from 0 to 32. A value of 0 for $S_{edge}$ indicates that the central pixel is not situated on an edge or line feature. A value from 1 to 32 for $S_{edge}$ indicates that the central pixel is situated on an edge or line feature. When between 1 and 32, the value of $S_{edge}$ indicates the strength of the edge or line feature with 1 indicating a weak edge up to 32 indicating a strong edge or line. In one embodiment, $S_{detail}$ is a non-negative number ranging from 0 to 16 with 0 indicating little or no detail around the central pixel and 16 indicating heavy/chaotic detail around the central pixel.

As noted above, the image processor 208 determines an estimation of the type of image environment in which the central pixel is situated based at least in part upon differences in pixel regions along a vertical column of pixels in the matrix of pixels and differences in pixel regions along a horizontal row of pixels that intersects the vertical column at the central pixel. FIG. 6 shows the matrix of pixels of FIG. 5 highlighting a central vertical column of pixels 602 and a horizontal row of pixels 604 intersecting the vertical column 602 at the central pixel. In the embodiment, vertical column 602 is a 5×1 column of pixels and the horizontal row 604 is a 1×5 row of pixels. Other dimensions for the vertical column and the horizontal row are possible depending on the size of the image window 320 and the invention is not limited to a 9×9 image window, a 5×1 vertical column, or a 1×5 horizontal row. For example, with an 11×11 image window up to a 7×1 vertical column and up to a 1×7 horizontal row is possible.

In one embodiment, the image processor 208 determines $S_{edge}$ and $S_{detail}$ for the central pixel by performing the following operations.

Difference Values

Initially, the image processor 208 determines two sets of difference values for each pixel in the vertical column and for each pixel in the horizontal row. A difference value in the first set of difference values for a pixel represents a magnitude by which a pixel region neighboring the pixel differs in luminosity, if at all, from a pixel region containing the pixel. A difference value in the second set of difference values for a pixel represents the direction in which luminosity is changing, if at all, between the two pixel regions. In one embodiment, each pixel region comprises at least one pixel of each color channel of the CFA. In one embodiment, each pixel region comprises a 2×2 pixel patch of pixels. Note that with both three color channel CFAs (e.g., Bayer) or four color channel CFAs (e.g., CYGM, RGBE, etc.), using a 2×2 pixel region includes all color channels of the CFA in each pixel region.

In one embodiment, when determining a difference value in the first set of difference values and a difference value in the second set of difference values for a pixel in question, the image processor 208 differences a neighboring pixel region and a pixel region containing the pixel in question on a color-channel by color-channel basis. The image processor 208 then calculates two different sums of the per-color-channel differences. One sum represents the magnitude of the luminosity difference between the neighboring pixel region and the pixel region containing the pixel in question. The other sum represents the direction luminosity is changing between the two pixel regions (i.e., is the image getting brighter or darker when moving from one of the pixel regions to the other pixel region). For expository purposes, the sum of the per-color channel differences between the two pixel regions that represents the magnitude of the luminosity difference between the two pixel regions will be referred to herein as the "magnitude difference value" for the neighboring pixel region and the pixel in question. The sum that represents the direction luminosity is changing between the two regions will be referred to herein as the "direction difference value" for the neighboring pixel region and the pixel in question.

In one embodiment, the image processor 208 determines a magnitude difference value for each of four neighboring pixel regions (above, below, left, and right) at each pixel in the vertical column and at each pixel in the horizontal row for a total of (#ColPixels*4) magnitude difference values determined for the vertical column (where #ColPixels is the total number of pixels in the vertical column) and (#RowPixels*4) magnitude difference values determined for the horizontal row (where #RowPixels is the total number of pixels in the horizontal row). In addition, the image processor 208 determines a direction difference value for each of the left and right neighboring pixel regions at each pixel in the vertical column for a total of (#ColPixels*2) direction difference values for the vertical column. In addition, the image processor 208 determines a direction difference value for each of the above and below neighboring pixel regions at each pixel in the horizontal row for a total of (#RowPixels*2) direction difference values for the horizontal row. Thus, these determined magnitude difference values for the vertical column and the horizontal row provide information about the magnitude of change in luminosity in the image both parallel with and perpendicular to the vertical column and parallel with and perpendicular to the horizontal row. These determined signed difference values provide information about the direction of change in luminosity in the image perpendicular to the vertical column and perpendicular to the horizontal row.

As noted above, the magnitude difference value for a neighboring pixel region and a pixel in question in the vertical column or the horizontal row is determined by determining a sum of the per-color-channel differences between the neighboring pixel and a pixel region containing the pixel in question. Similarly, the direction difference value for the neighboring pixel region and the pixel in question is also determined by determining a sum of the per-color-channel differences between the two regions. For example, FIG. 7A shows the matrix of FIG. 5 in which the highlighted pixels are pixels involved in determining four magnitude difference values (left, right, above, below) and two direction difference values (left and right) for a pixel in question 702 (pixel 23) in the vertical column 602 of FIG. 6. According to one embodiment, the image processor 208 calculates these four magnitude difference values and these two direction difference values for pixel 23 as follows:

Magnitude Difference Values for Pixel 23

$MDV_{Left\ pixel\ region} = (ABS(V_{pixel12} - V_{pixel14}) + ABS(V_{pixel13} - V_{pixel15}) + ABS(V_{pixel21} - V_{pixel23}) + ABS(V_{pixel22} - V_{pixel24}))$ $MDV_{Right\ pixel\ region} = (ABS(V_{pixel13} - V_{pixel15}) + ABS(V_{pixel14} - V_{pixel16}) + ABS(V_{pixel22} - V_{pixel24}) + ABS(V_{pixel23} - V_{pixel25}))$ $MDV_{Above\ pixel\ region} = (ABS(V_{pixel5} - V_{pixel23}) + ABS(V_{pixel14} - V_{pixel32}) + ABS(V_{pixel6} - V_{pixel24}) + ABS(V_{pixel15} - V_{pixel33}))$ $MDV_{Below\ pixel\ region} = (ABS(V_{pixel14} - V_{pixel32}) + ABS(V_{pixel23} - V_{pixel41}) + ABS(V_{pixel15} - V_{pixel33}) + ABS(V_{pixel24} - V_{pixel42}))$ Direction Difference Values for Pixel 23

$DDV_{Left\ pixel\ region} = SIGN((V_{pixel12} - V_{pixel14}) + (V_{pixel13} - V_{pixel15}) + (V_{pixel21} - V_{pixel23}) + (V_{pixel22} - V_{pixel24}))$ $DDV_{Right\ pixel\ region} = SIGN((V_{pixel13} - V_{pixel15}) + (V_{pixel14} - V_{pixel16}) + (V_{pixel22} - V_{pixel24}) + (V_{pixel23} - V_{pixel25}))$ FIG. 7B shows the matrix of FIG. 5 in which the highlighted pixels are the pixels involved in determining four magnitude difference values (left, right, above, below) and two direction difference values (above and below) for a pixel in question 704 (pixel 39) in the horizontal row 604 of FIG. 6. According to one embodiment, the image processor 208 calculates these four magnitude difference values and these two direction difference values for pixel 39 as follows:

Magnitude Difference Values for Pixel 39

$$MDV_{Left\,pixel\,region}=(ABS(V_{pixel28}-V_{pixel30})+ABS(V_{pixel29}-V_{pixel31})+ABS(V_{pixel37}-V_{pixel39})+ABS(V_{pixel38}-V_{pixel40}))$$

$$MDV_{Right\,pixel\,region}=(ABS(V_{pixel29}-V_{pixel31})+ABS(V_{pixel30}-V_{pixel32})+ABS(V_{pixel38}-V_{pixel40})+ABS(V_{pixel39}-V_{pixel41}))$$

$$MDV_{Above\,pixel\,region}=(ABS(V_{pixel21}-V_{pixel39})+ABS(V_{pixel22}-V_{pixel40})+ABS(V_{pixel30}-V_{pixel48})+ABS(V_{pixel31}-V_{pixel49}))$$

$$MDV_{Below\,pixel\,region}=(ABS(V_{pixel30}-V_{pixel48})+ABS(V_{pixel31}-V_{pixel49})+ABS(V_{pixel39}-V_{pixel57})+ABS(V_{pixel40}-V_{pixel58}))$$

Direction Difference Values for Pixel 39

$$DDV_{Above\,pixel\,region}=SIGN((V_{pixel21}-V_{pixel39})+(V_{pixel22}-V_{pixel40})+(V_{pixel30}-V_{pixel48})+(V_{pixel31}-V_{pixel49}))$$

$$DDV_{Below\,pixel\,region}=SIGN((V_{pixel30}-V_{pixel48})+(V_{pixel31}-V_{pixel49})+(V_{pixel39}-V_{pixel57})+(V_{pixel40}-V_{pixel58}))$$

Figure 8A:
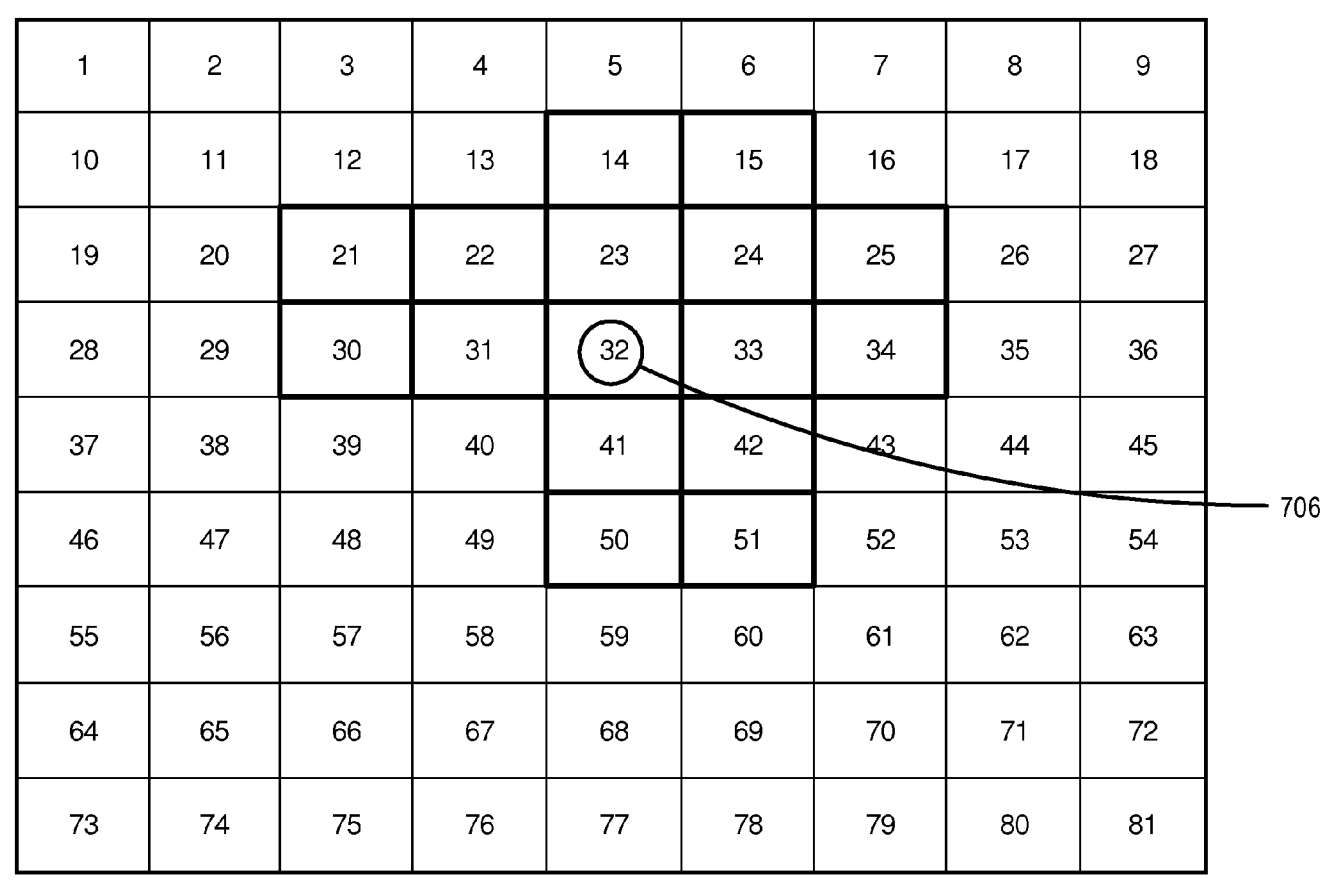
Figure 8B:
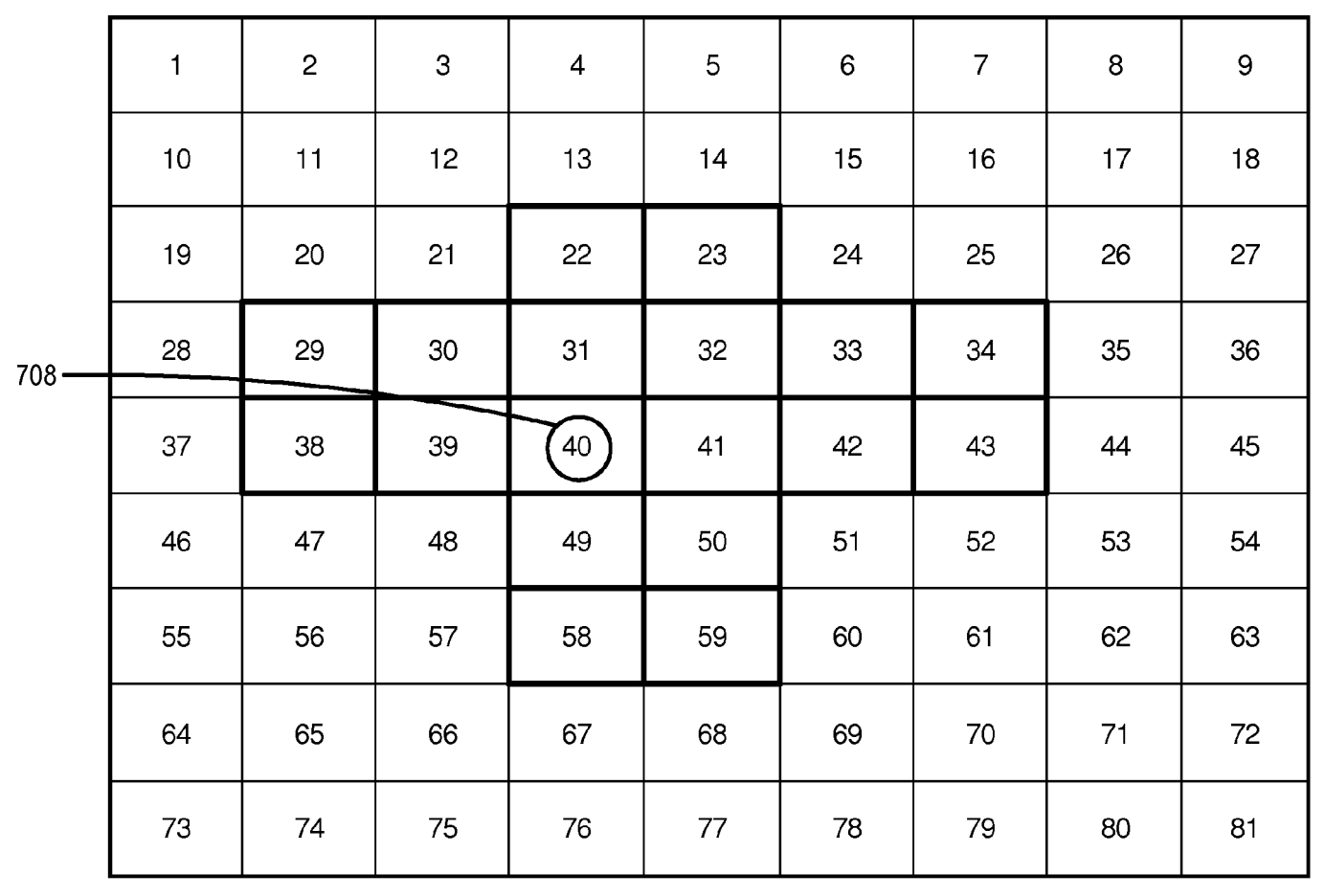

The image processor 208 may perform similar calculations for the remaining pixels (e.g., pixels 32, 41, 50, and 59) in the vertical column (e.g., vertical column 602 of FIG. 6) and the remaining pixels (e.g., pixels 39, 40, 41, 42, and 43) in the horizontal row (e.g., vertical column 604 of FIG. 6), each time selecting the four neighboring pixel regions with respect to the next pixel in question. For example, FIG. 8A shows the matrix of FIG. 5 in which the highlighted pixels are pixels involved in determining four magnitude difference values (left, right, above, below) and two direction difference values (left and right) for the next pixel in question 706 (pixel 32) down the vertical column 602 of FIG. 6. FIG. 8B shows the matrix of FIG. 5 in which the highlighted pixels are the pixels involved in determining four magnitude difference values (left, right, above, below) and two direction difference values (above and below) for the next pixel in question 708 (pixel 40) along the horizontal row 604 of FIG. 6. According to one embodiment, for example, the calculations for the four magnitude difference values and the two direction difference values for pixels 32 and 40 are as follows:

Magnitude Difference Values for Pixel 32

$$MDV_{Left\,pixel\,region}=(ABS(V_{pixel21}-V_{pixel23})+ABS(V_{pixel22}-V_{pixel24})+ABS(V_{pixel30}-V_{pixel32})+ABS(V_{pixel31}-V_{pixel33}))$$

$$MDV_{Right\,pixel\,region}=(ABS(V_{pixel22}-V_{pixel24})+ABS(V_{pixel23}-V_{pixel25})+ABS(V_{pixel31}-V_{pixel33})+ABS(V_{pixel32}-V_{pixel34}))$$

$MDV_{Above\,pixel\,region}$=Same as $MDV_{Below\,pixel\,region}$ for pixel 23

$$MDV_{Below\,pixel\,region}=(ABS(V_{pixel23}-V_{pixel41})+ABS(V_{pixel32}-V_{pixel50})+ABS(V_{pixel24}-V_{pixel42})+ABS(V_{pixel33}-V_{pixel51}))$$

Direction Difference Values for Pixel 32

$$DDV_{Left\,pixel\,region}=SIGN((V_{pixel21}-V_{pixel23})+(V_{pixel22}-V_{pixel24})+(V_{pixel30}-V_{pixel32})+(V_{pixel31}-V_{pixel33}))$$

$$DDV_{Right\,pixel\,region}=SIGN((V_{pixel22}-V_{pixel24})+(V_{pixel23}-V_{pixel25})+(V_{pixel31}-V_{pixel33})+(V_{pixel32}-V_{pixel34}))$$

Magnitude Difference Values for Pixel 40

$MDV_{Left\,pixel\,region}$=Same as $MDV_{Right\,pixel\,region}$ for pixel 39

$$MDV_{Right\,pixel\,region}=(ABS(V_{pixel30}-V_{pixel32})+ABS(V_{pixel31}-V_{pixel33})+ABS(V_{pixel39}-V_{pixel41})+ABS(V_{pixel40}-V_{pixel42}))$$

$$MDV_{Above\,pixel\,region}=(ABS(V_{pixel22}-V_{pixel40})+ABS(V_{pixel23}-V_{pixel41})+ABS(V_{pixel31}-V_{pixel49})+ABS(V_{pixel32}-V_{pixel50}))$$

$$MDV_{Below\,pixel\,region}=(ABS(V_{pixel31}-V_{pixel49})+ABS(V_{pixel32}-V_{pixel50})+ABS(V_{pixel40}-V_{pixel58})+ABS(V_{pixel41}-V_{pixel59}))$$

Direction Difference Values for Pixel 40

$$DDV_{Above\,pixel\,region}=SIGN((V_{pixel22}-V_{pixel140})+(V_{pixel23}-V_{pixel41})+(V_{pixel31}-V_{pixel49})+(V_{pixel32}-V_{pixel50}))$$

$$DDV_{Below\,pixel\,region}=SIGN((V_{pixel31}-V_{pixel49})+(V_{pixel31}-V_{pixel50})+(V_{pixel40}-V_{pixel58})+(V_{pixel41}-V_{pixel59}))$$

In the above calculations, ABS( ) is the absolute value of the result of the contained equation. SIGN( ) is either 0, −1 (or some other negative number), or 1 (or some other positive number) depending on whether the result of the contained equation is 0, a negative number, or a positive number. Thus, a magnitude difference value is a non-negative number and a direction difference value is either 0, −1 (or some other negative number), or 1 (or some other positive number).

The V values (e.g., $V_{pixel12}$) in the above example sums are original pixel values of the indicated pixels. In one embodiment, only the N most significant bits of each pixel are used when determining magnitude and direction difference values so as to conserve gate count in hardware implementations. For example, in one embodiment, prior to determining magnitude and direction difference values for the vertical column and the horizontal row in the matrix of pixels, each M-bit (e.g., 10-bit) pixel value in the matrix is bitwise shifted X bits (e.g., 2 bits) such that magnitude and direction difference values are determined using only the (M−X) (e.g., 8) most significant bits of each original M-bit pixel value in the matrix.

Determining the set of differences values for each pixel in the vertical column and for each pixel in the horizontal row can be performed efficiently by recognizing the following:

$MDV_{Left\,pixel\,region}$ and $MDV_{Right\,pixel\,region}$ for each pixel in question have two subtractions in common. For example, $MDV_{Left\,pixel\,region}$ and $MDV_{Right\,pixel\,region}$ for pixel 23 have subtractions ($V_{pixel13}-V_{pixel15}$) and ($V_{pixel22}-V_{pixel24}$) in common;

$MDV_{Above\,pixel\,region}$ and $MDV_{Below\,pixel\,region}$ for each pixel in question have two subtractions in common. For example, $MDV_{Above\,pixel\,region}$ and $MDV_{Below\,pixel\,region}$ for pixel 23 have subtractions ($V_{pixel14}-V_{pixel132}$) and ($V_{pixel15}-V_{pixel33}$) in common.

When moving down the vertical column to the next pixel in question, $MDV_{Above\,pixel\,region}$ for the next pixel in question is identical to $MDV_{Below\,pixel\,region}$ for the previous pixel in question (similarly, when moving up the vertical column). For example, $MDV_{Above\,pixel\,region}$ for pixel 32 is identical to $MDV_{Below\,pixel\,region}$ for pixel 23.

When moving right along the horizontal row to the next pixel in question, $MDV_{Left\,pixel\,region}$ for the next pixel in question is identical to $MDV_{Right\,pixel\,region}$ for the previous pixel in question (similarly, when moving left along the horizontal row). For example, $MDV_{Left\ pixel\ region}$ for pixel 40 is identical to $MDV_{Right\ pixel\ region}$ for pixel 39.

$MDV_{Left\ pixel\ region}$, $MDV_{Right\ pixel\ region}$, $MDV_{Above\ pixel\ region}$, $MDV_{Below\ pixel\ region}$, $DDV_{Above\ pixel\ region}$, $DDV_{Below\ pixel\ region}$ are identical for the central pixel (e.g., pixel 41) whether they are calculated as part of the vertical column or the horizontal row.

Taking this into account, the number of subtractions can be minimized. This is especially beneficial in hardware implementations as it reduces gate count in the image processor 208. For example, when the vertical column is 5×1 and the horizontal row is 1×5 as depicted in FIG. 6, all 20 magnitude difference values (of which only 16 are unique) and all 10 direction difference values for the vertical column or the horizontal row can be calculated with 32 subtractions. The twenty magnitude difference values (of which only 16 are unique) and the 10 direction difference values for the other of the vertical column or the horizontal row can be calculated in 20 additional subtractions. Thus, in this example, all 40 magnitude difference values and all 20 direction difference values can be calculated in a total of 52 subtractions.

Difference Indicator Scores

After the image processor 208 has determined a magnitude difference value for a neighboring pixel region and a pixel in question in the vertical column or the horizontal row, the image processor 208 determines a difference indicator score for the neighboring pixel region and the pixel in question. As noted above, this difference indicator score provides a "soft" inequality indicating whether and to what extent a pixel of the same color channel as the pixel in question in the neighboring pixel region can be of aid in denoising the pixel in question.

In one embodiment, to determine this difference indicator score, the image processor 208 initially divides a numerical range in a standard deviation like fashion into numerical sub-ranges based on the difference threshold value determined for the central pixel. The difference threshold value determines the maximal extent that a neighboring pixel region can differ from a region containing the pixel in question and still be considered suitable for use in denoising the pixel in question. The image processor 208 determines the difference indicator score for the neighboring pixel region and the pixel in question based on what sub-range of the difference threshold value-based numerical range that the corresponding magnitude difference value falls into.

In one embodiment, for example, the image processor 208 assigns a difference indicator score of 1 when the corresponding magnitude difference value is between zero and the difference threshold, indicating that the neighboring pixel region can be of aid in denoising the pixel in question. The image processor 208 assigns a difference indicator score of 2 when the corresponding magnitude difference value is between the difference threshold value and 1.5 times the difference threshold value, indicating that the neighboring pixel region can be of less aid in denoising the pixel in question. The image processor 208 assigns a difference indicator score of 3 when the corresponding magnitude difference value is between 1.5 times the difference threshold value and 2 times the difference threshold value, indicating that the neighboring pixel region can be of yet less aid in denoising the given pixel. The image processor 208 assigns a difference indicator score of 0 when the corresponding magnitude difference value is greater than 2 times the difference threshold value, indicating that the neighboring pixel region can be of no aid in denoising the given pixel. Other numerical sub-ranges and calculations may be used to achieve a "soft" inequality between magnitude difference values and the difference threshold value.

In an exemplary embodiment, the image processor 208 determines four difference indicator scores (one for each of above, below, left, right neighboring pixel regions) for each pixel in the vertical column and for each pixel in horizontal row. Thus, in the exemplary embodiment depicted in FIG. 6 in which the vertical column is 5×1 and the horizontal row is 1×5, the image processor 208 determines twenty difference indicator scores for the vertical column 602 and determines twenty difference indicator scores for the horizontal row 604.

Note that the image processor 208 can determine a difference indicator score for neighboring pixel region and a pixel in question in the vertical column or the horizontal row as soon as the corresponding magnitude difference value has been determined. Significantly, the image processor 208 need not wait until all magnitude difference values for the vertical column and the horizontal row have been determined before it can begin determining difference indicator scores.

In one embodiment just described, the same difference threshold value determined for the central pixel is used when determining difference indicator scores for each pixel in the vertical column and each pixel in the horizontal row. In another embodiment, the difference threshold determined for the central pixel is used when determining difference indicator scores for each pixel in the vertical column. However, when determining difference indicator scores for a given pixel in the horizontal row, a difference threshold value determined for that given pixel in the horizontal row is used. Note that for the pixel in the horizontal row that intersects the vertical column, the difference threshold value determined for the central pixel may be used. For example, referring to FIG. 6, five different difference threshold values may be used when determining difference indicator scores for the vertical column 602 and the horizontal row 604: one each for pixels 39, 40, 42, and 43 and one for pixels 23, 32, 41, 50, and 59. By using a difference threshold value determined for a given pixel in the horizontal row when determining difference indicator scores for that given pixel, the accuracy of the image environment estimation based on the difference indicator scores determined for the horizontal row is increased at the expense of increased gate count in hardware implementations.

$S_{edge}$ and $S_{detail}$

After the image processor 208 has determined the difference indicator scores and the direction difference values for the vertical column of pixels and the horizontal row of pixels, the image processor 208 determines $S_{edge}$ and $S_{detail}$ based at least in part on these difference indicator scores and these direction difference values. As noted, $S_{edge}$ indicates the strength of a possible edge or line feature on which the central pixel of the current image window is situated. $S_{detail}$ indicates the amount of detail around the central pixel in the image in the event $S_{edge}$ indicates no edge or line feature.

$S_{edge}$

In one embodiment, the image processor 208 determines $S_{edge}$ for the central pixel of the current image window by performing the following operations.

Initially, the image processor 208 determines four sums based on the direction difference values determined for the vertical column of pixels and the horizontal row of pixels. A first determined sum is the sum of the direction difference values determined for the left pixel regions along the vertical column (left direction difference values). A second determined sum is the sum of the direction difference values determined for the right pixel regions along the vertical column (right direction difference values). A third determined sum is the sum of the direction difference values determined for the above pixel regions along the horizontal row (above direction difference values). A fourth determined sum is the sum of the direction difference values determined for the below pixel regions along the horizontal row (below direction difference values). Recall that in one embodiment, each direction difference value is either 0, 1, or −1. Thus, in one embodiment, for a five-pixel vertical column and a five-pixel horizontal row, each of these four sums is a number between −5 and 5.

After determining the sum of the left direction difference values, the sum of the right direction difference values, the sum of the above direction difference values, and the sum of the below direction difference values, the image processor 208 determines the absolute value of the sum (vertical direction difference score) of (a) the sum of the left direction difference values and (b) the sum of the right direction difference values. In addition, the image processor 208 determines the absolute value of the sum (horizontal direction difference score) of (a) the sum of the above direction difference values and (b) the sum of the below direction difference values. Thus, for a five-pixel vertical column and a five-pixel horizontal row in which each direction difference value is either 0, 1, or −1, the vertical direction difference score is non-negative number between 0 and 10 and the horizontal direction difference score is a non-negative number between 0 and 10.

The vertical direction difference score and the horizontal direction difference score provide an indication of the strength of the edge or line on which the current central pixel might be situated. For example, for a five-pixel vertical column and a five-pixel horizontal row in which each direction difference value is either 0, 1, or −1, a vertical direction difference score of 10 indicates that the central pixel is situated on a strong strictly vertical edge or line feature. Similarly, a horizontal direction difference score of 10 indicates that the central pixel is situated on a strong strictly horizontal edge or line feature. This is so because, the closer the vertical direction difference score or the horizontal direction difference score is to its maximum value (e.g., 10), the more aligned the horizontal or vertical derivatives are (either the horizontal derivatives in the vertical direction case or the vertical derivatives in the horizontal direction case). In other words, aligned derivates indicate strictly vertical or strictly horizontal edges or lines.

However, a thin vertical line or a thin horizontal line on which the central pixel is situated might not bring the vertical direction difference score or the horizontal direction difference score close to its maximum value (e.g., 10). Accordingly, in one embodiment, the image processor 208 determines two additional scores that provide an indication of the strength of the line on which the current central pixel might be situated. These two additional scores are based on the following observations:

If the central pixel is situated on a thin vertical line, then the difference indicator scores determined for the vertical column of pixels should indicate that the pixels for the left and right pixel regions along the vertical column would not be of aid in denoising pixels of the vertical column. Further, if the central pixel is situated on a thin vertical line, then the difference indicator scores determined for the vertical column should indicate that the pixels for the above and below pixel regions along the vertical column would be of aid of denoising pixels of the vertical column.

Similarly, if the central pixel is situated on a thin horizontal line, then the difference indicator scores determined for the horizontal row of pixels should indicate that the pixels for the above and below pixel regions along the horizontal row would not be of aid in denoising pixel of the horizontal row. Further, if the central pixel is situated on a thin horizontal line, then the difference indicator scores determined for the horizontal row should indicate that the pixels for the left and right pixel regions along the horizontal row would be of aid in denoising the pixels of the horizontal row.

Accordingly, in one embodiment, the image processor 208 determines a first of these two additional scores (vertical line score) by determining how many of the left and right pixel regions along the vertical column according their respective difference indicator scores would not be of aid in denoising pixels along the vertical column and how many of the above and below pixel regions along the vertical column according to their respective difference indicator scores would be of aid in denoising pixels along the vertical column. The less the number of left and right pixel regions along the vertical column that would be of aid in denoising pixels of the vertical column and the more the number of above and below pixel regions that would be of aid, the greater likelihood that the central pixel is situated on a thin vertical line and, hence, the higher the vertical line score. Conversely, the more the number of left and right pixel regions that would be of aid in denoising pixels of the vertical column and the less the number of above and below pixel regions that would be of aid, the less likelihood that the central pixel is situated on a thin vertical line and, hence, the lower the vertical line score. In one embodiment, the vertical line score ranges from −20 to 20 with a score of 20 indicating a strong likelihood that the central pixel is situated on a thin vertical line.

The image processor 208 determines the second of these two additional scores (horizontal line score) for the horizontal row of pixels in a similar fashion. In particular, the less the number of above and below pixel regions along the horizontal row that would be of aid in denoising pixels of the horizontal row and the more the left and right pixel would be of aid, the greater likelihood that the central pixel is situated on a thin horizontal line and, hence, the higher the horizontal line score. Conversely, the more the number of above and below pixel regions along the horizontal row would be of aid in denoising pixels of the horizontal row and the less the number of left and right pixel regions that would be of aid, the less likelihood that the central pixel is situated on a thin horizontal line and, hence, the lower the horizontal line score. In one embodiment, the horizontal line score ranges from −20 to 20 with a score of 20 indicating a strong likelihood that the central pixel is situated on a thin horizontal line.

After determining the vertical direction difference score, the horizontal direction difference score, the vertical line score, and the horizontal line score, the image processor 208 proceeds to determine $S_{edge}$ for the central pixel of the current image window. In one embodiment, the image processor 208 determines $S_{edge}$ for the central pixel of the current image window as follows:

1. The following variables are initially set:
   a. Let $V_{score}$=vertical direction difference score+vertical line score.
   b. Let $H_{score}$=horizontal direction difference score+horizontal line score.
   c. Let $V_{numlarge}$=The number of distinct magnitude difference values for the vertical column that are greater than or equal to the difference threshold value. For example, for the 5×1 vertical column, there are 16 distinct magnitude difference values, thus, $V_{numlarge}$ in this case would range from 0 to 16.

d. Let $H_{numlarge}$=The number of distinct magnitude difference values for the horizontal row that are greater than or equal to the difference threshold value. For example, the 1×5 horizontal row, there are 16 distinct magnitude difference values, thus, $H_{numlarge}$ in this case would range from 0 to 16.

2. If $V_{score}*H_{score}<0$, then the central pixel is situated on a strong strictly vertical or strictly horizontal edge or line feature. In this case, $S_{edge}$ is the positive value of $V_{score}$ and $H_{score}$. If $H_{score}$ is positive, then $S_{edge}=-H_{score}$ so that the horizontal direction is indicated.

3. Else if $V_{score}>0$ and $H_{score}>0$, then the central pixel might be situated on a diagonal edge or line. In this case, if both the vertical direction difference score and the horizontal direction difference score are greater than or equal to a threshold, then $S_{edge}=V_{score}+H_{score}$. If $V_{numlarge}>H_{numlarge}$, then $S_{edge}=-(V_{score}+H_{score})$ so that the horizontal direction is indicated.

4. If (2) and (3) above are both not met, then $S_{edge}=0$, or "details". In this case, the maximum of $V_{numlarge}$ and $H_{numlarge}$ determines the amount (strength) of the detail around the central pixel.

$S_{detail}$

As noted above, if the $S_{edge}=0$, then some amount of detail around the central pixel is assumed. In this case, the maximum of $V_{numlarge}$ and $H_{numlarge}$ indicates the amount of detail around the central pixel. In one embodiment, $S_{detail}$ is a non-negative number ranging from 0 to 16 with 0 indicating little or no detail around the central pixel and 16 indicating heavy/chaotic detail around the central pixel. Other ranges are possible, if so desired.

Together, $S_{edge}$ and $S_{detail}$, represent an estimation of the type of image environment in which the central pixel of the current image window is situated. As in the above example, $S_{edge}$ and $S_{detail}$ estimation are used to adjust an initial denoising power for the central pixel to produce an adjusted denoising power for the central pixel.

The above approach based on $S_{edge}$ and $S_{detail}$ is but one example of an approach for estimating the type of image environment in which the central pixel is situated. Other approaches may be used, if so desired.

Difference Threshold Value and Initial Denoising Power

As noted above, the image processor 208 determines the similarity between pixel regions surrounding the central pixel in the matrix of pixels based on a difference threshold value. In one embodiment, the difference threshold value is dependent on a signal level of the matrix of pixels (current signal level). In addition, in one embodiment, the initial denoising power, $P_{initial}$, is also dependent on the current signal level.

Both the difference threshold value and the initial denoising power value, $P_{initial}$, tribute to the anisotropic behavior of the image processor 208. On the one hand, the difference threshold value determines the maximal extent that two pixel regions in the matrix of pixels can differ and still be considered close. Close pixel regions are used, along with central pixel region in the matrix, in the denoising process. In one embodiment, the difference threshold value is a non-decreasing function of an estimated current signal level at the central pixel of the matrix of pixels. The estimate of the current signal level is made such that the power map is kept smooth. As noted above, the initial denoising power value, $P_{initial}$, is adjusted (raised, lowered, or kept the same) based on an assessment of the type of image environment in which the central pixel is situated (edge/line or detail). This assessment depends on the difference threshold value determined for the central pixel. Thus, the adjusted denoising power, $P_{adjusted}$, for the central pixel implicitly depends on the different threshold value determined for the central pixel. Hence, the smoothness in the difference threshold value implicitly contributes to smoothness in denoising power.

On the other hand, the initial denoising power value, $P_{initial}$, determines a baseline for "how much" denoising will be performed at a given pixel (i.e., how much weight the given pixel is allotted), given that neighboring pixel regions are considered close enough according to the difference threshold value to be used for denoising the given pixel. In other words, the initial denoising power value, $P_{initial}$, sets a baseline that determines how neighboring pixels will be combined with the given pixel when denoising the given pixel. Accordingly, in one embodiment, the initial denoising power value, $P_{initial}$, is a function of luminance (i.e., brightness) at the central pixel since, for low-luminance (i.e., low-light), it may be desirable to lessen the denoising power baseline in order to preserve details in the image, while at other higher luminance levels, a higher denoising power baseline might be desirable.

Figure 9:
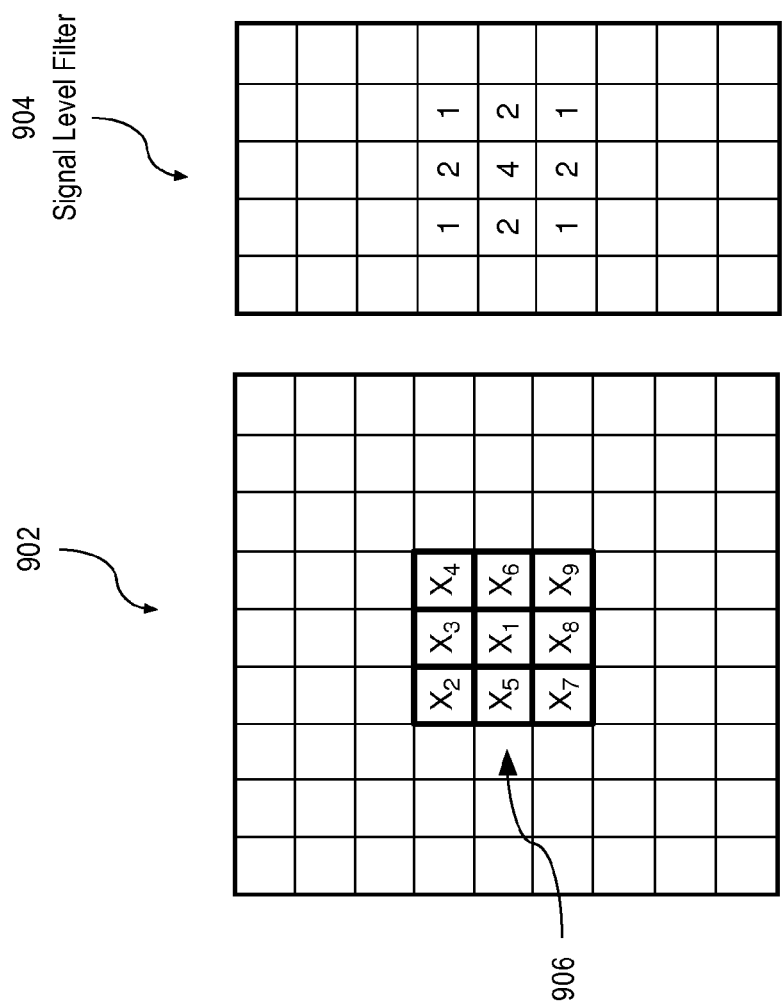
FIG. 9 depicts a matrix of pixels and a signal level filter for determining an estimate of the current signal level at the central pixel of the matrix of pixels, in accordance with one embodiment of the present invention.

In one embodiment, the image processor 208 determines an estimate of the current signal level that is suitable for both determining a difference threshold value that keeps the power map smooth and determining an initial denoising power value, $P_{initial}$, as a function luminance at the central pixel. In one embodiment, the image processor 208 does so by applying a signal level filter to the matrix of pixels. Various filters may be used for this purpose, but one particular filter that is used in one embodiment of the present invention is the filter 904 shown in FIG. 9. This filter 904 is designed to be applied to a 3×3 sub-matrix of pixels 906 of the matrix of pixels 902 currently selected by the image window 320, and the values in the filter 904 represent the weights to be applied to the pixel values of the pixels in the 3×3 sub matrix 906. For example, suppose that filter 904 is to be applied to the sub matrix 906 shown in FIG. 6, where the pixels have pixel values $X_1$ through $X_9$. In such a case, the "1" weighting factor of the top leftmost element of the filter 904 would be applied to the top leftmost pixel value $X_2$ of the sub matrix 906, the "2" weighting factor of the top center element of the filter 904 would be applied to the top center pixel value $X_3$ of the sub matrix 906, the "1" weighting factor of the top rightmost element of the filter 904 would be applied to the top rightmost pixel value $X_4$ of the sub matrix 0-6, and so on. Expressed mathematically, application of the filter 904 to sub matrix 906 would yield a Y value as given in the following equation:

$$Y=(1X_2+2X_3+1X_4+2X_5+4X_1+2X_6+1X_7+2X_8+1X_9)/16 \quad \text{(Eq. 7)}$$

The total is divided by 16 because 16 is the sum of all of the weights in filter 904. In effect, application of the filter 904 to the sub matrix 906 produces a weighted average of the nine pixel values, with the middle pixel value $X_1$ getting the greatest weight. In a Bayer pattern mosaic image, the nine pixels in the sub matrix 906 will include pixels of all three colors. Thus, the weighted average will reflect pixel values of all three colors.

In one embodiment, the image processor 208 determines an estimate of the current signal level for the matrix of pixels (FIG. 5) currently selected by the image window 320 by applying the filter 904 to the central 3×3 sub-matrix of the matrix of pixels. This sub-matrix includes pixels 31, 32, 33, 40, 41, 42, 49, 50, and 51. Doing so allows an estimate of the current signal level the central pixel to be determined.

It should be noted that filter 904 is provided merely as an example of a filter that may be used. Other filters with different configurations and different weights may be used if so desired. All such filters are within the scope of the present invention.

After the estimate of the current signal level (current signal level estimate) at the central pixel has been determined, the image processor proceeds to determine the difference threshold value for the central pixel using a difference threshold function and proceeds to determine the initial denoising power value for the central pixel, $P_{initial}$, using a denoising power function.

Difference Threshold Function

In one embodiment, the difference threshold function is a piecewise linear function whose domain is the current signal level estimate value for the central pixel and whose range is the difference threshold value for the central pixel. The input to the function is the current signal level estimate. The output is the difference threshold value for the central pixel as a function of the current signal level estimate for the central pixel. Various difference threshold functions may be used for this purpose, but one particular difference threshold function that is used in one embodiment of the present invention is the difference threshold function graphed in FIG. 10. Significantly, when the central pixel is situated in a high-luminance (i.e., bright-light image environment) as indicated by a higher current signal level estimate, the outputted difference threshold value is closer to its maximum. This means that when the central pixel is situated in a high-luminance image environment, the less similarity is needed between pixel regions in order for neighboring pixel regions to be considered close enough to be used in the denoising process. Conversely, when the central pixel is situated in a low-luminance environment, more similarly is needed thereby preserving details in the low-light images.

Figure 10:
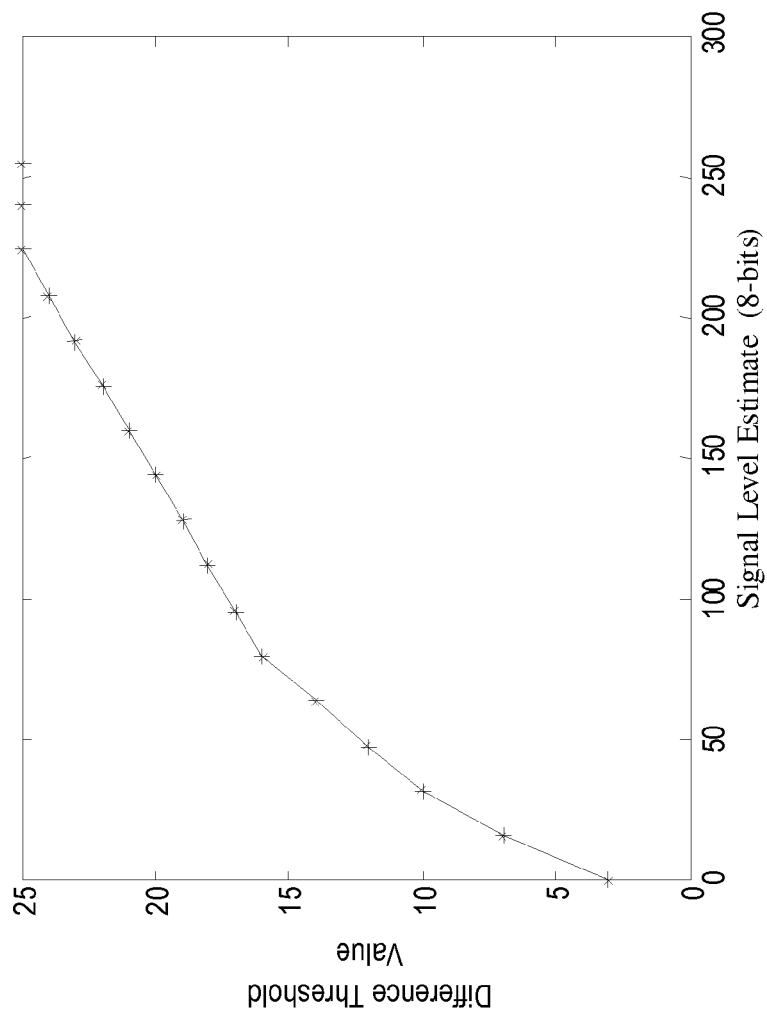
FIG. 10 is a graph of a difference threshold function, in accordance with one embodiment of the present invention.

It should be noted that the difference threshold function graphed in FIG. 10 is provided merely as an example of a difference threshold function that may be used. Other difference threshold functions with different mappings of the current signal level estimate to the difference threshold value may be used if so desired. All such difference threshold functions are within the scope of the present invention.

Denoising Power Function

In one embodiment, the denoising power function is a piecewise linear function whose domain is the current signal level estimate value for the central pixel and whose range is the initial denoising power value for the central pixel. The input to the function is the current signal level estimate. The output is the initial denoising power value for the central pixel, $P_{initial}$, as a function of the current signal level estimate for the central pixel. Various denoising power functions may be used for this purpose, but one particular denoising power function that is used in one embodiment of the present invention is the denoising power function graphed in FIG. 11. Significantly, when the central pixel is situated in a high-luminance (i.e., bright-light image environment) as indicated by a higher current signal level estimate, the outputted initial denoising power value for the central pixel, $P_{initial}$, is closer to its maximum. This means that when the central pixel is situated in a high-luminance image environment, the higher the denoising power baseline. Conversely, when the central pixel is situated in a low-luminance environment, the lower the denoising power baseline thereby preserving details in the low-light images.

Figure 11:
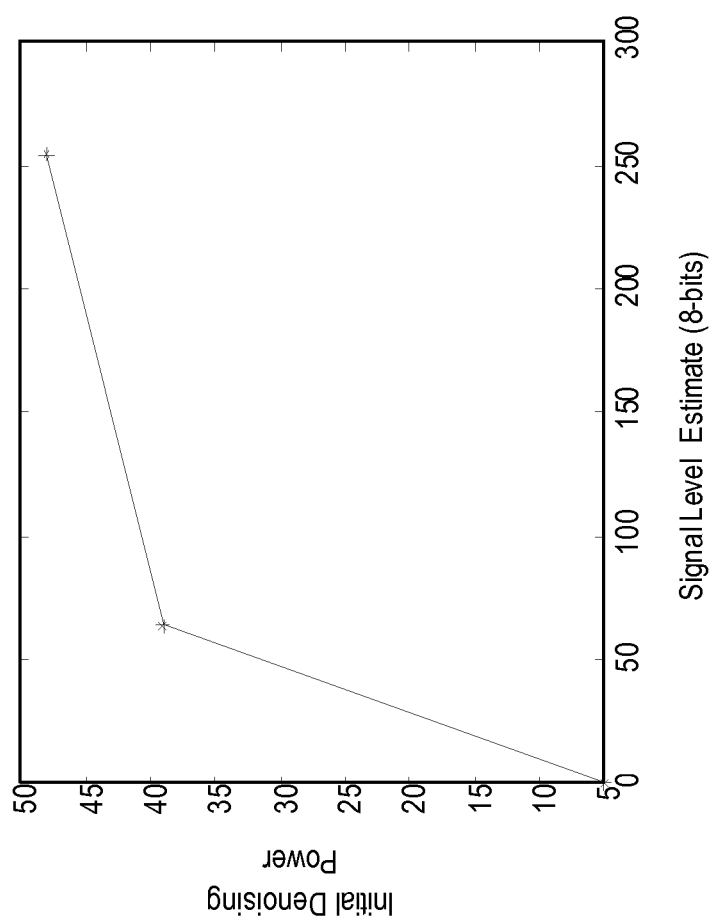
FIG. 11 is a graph of a denoising power function, in accordance with one embodiment of the present invention.

It should be noted that the denoising power function graphed in FIG. 11 is provided merely as an example of a denoising power function that may be used. Other denoising power functions with different mappings of the current signal level estimate to the initial denoising power value may be used if so desired. All such denoising power functions are within the scope of the present invention.

Difference Threshold Values for Horizontal Row Pixels

As described above, in one embodiment, when determining difference indicator scores for a given pixel in the horizontal row, a difference threshold value determined for the given pixel is used instead of using for all pixels in the horizontal row the difference threshold value determined for the central pixel. The difference threshold value determined for a given pixel in the horizontal row, other than the central pixel, may be determined in a manner similar to that described above for determining the difference threshold value for the central pixel. In particular, an estimate of the current signal level at the given pixel (instead of the central pixel) is made and provided as input to the difference threshold function. For example, an estimate of the current signal level at a given pixel in the horizontal row may be made by applying filter 904 or other suitable filter to a sub-matrix of pixels centered at the given pixel. The output of the difference threshold function is the difference threshold value to be used for the given pixel in the horizontal row when determining difference indicator scores for that given pixel.

Radial Adjustment of Difference Threshold Value and Initial Denoising Power Value For a number of reasons, noise in a digitally captured image is not equally distributed throughout the image. Instead, noise in an image often changes radially from the image center. Accordingly, in one embodiment, the difference threshold value determined for the central pixel and the initial denoising power value determined for the central pixel, $P_{initial}$, are adjusted based at least in part upon how far the central pixel of the current matrix of pixels is from the center of the image.

In one embodiment, the initial denoising power value is radially adjusted prior to being adjusted (block 112 of FIG. 1) based on the type of image environment in which the central pixel is situated. Thus, in this embodiment, it is the radially adjusted initial denoising power that is adjusted based on the type of image environment in which the central pixel is situated.

In one embodiment, the difference threshold value is radially adjusted prior to determination (block 110 of FIG. 1) of the type of the type of image environment in which the central pixel is situated. Thus, in this embodiment, determination of the type of image environment in which the central pixel is situated is based on the radially adjusted difference threshold value.

In one embodiment, radial adjustment of the initial denoising power value and the difference threshold value is based at least in part upon a determined radial distance between the current central pixel and a center of the image to which the central pixel belongs.

Example Computing Device

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computing devices, portable computing devices, handheld devices, networking devices or any other device that incorporates hard-wired and/or program logic to implement the techniques.

Figure 12:
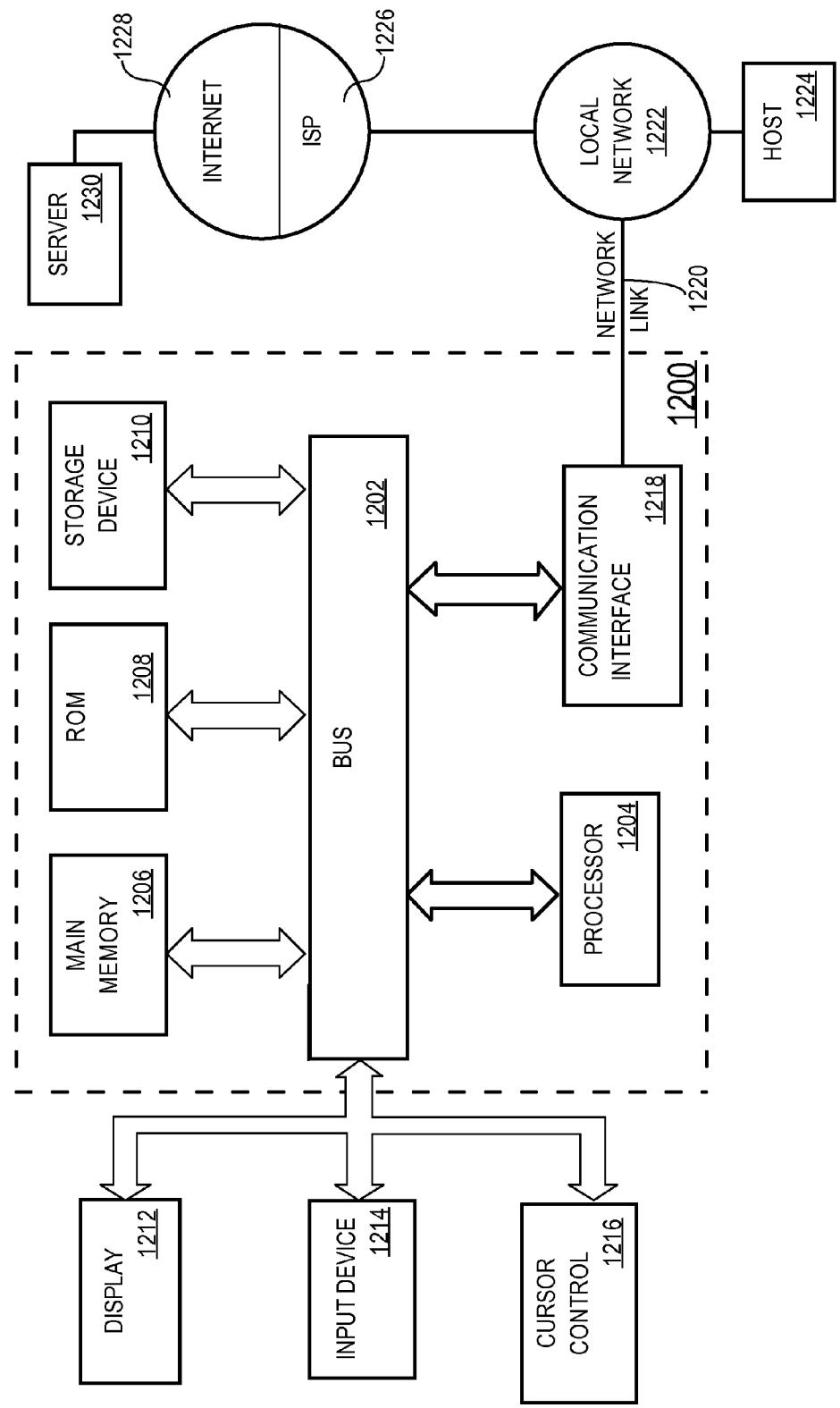
FIG. 12 is a block diagram of a sample computing device in which one embodiment of the present invention may be implemented.

For example, FIG. 12 is a block diagram that illustrates a computing device 1200 upon which an embodiment of the invention may be implemented. Computing device 1200 includes a bus 1202 or other communication mechanism for communicating information, and a hardware processor 1204 coupled with bus 1202 for processing information. Hardware processor 1204 may be, for example, a general purpose microprocessor.

Computing device 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computing device 1200 into a special-purpose machine that is customized to perform the operations specified in the instructions.

Computing device 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computing device 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computing device 1200 may implement the techniques described herein using customized hard-wired logic, one or more ASICs or FPGAs, firmware and/or program logic which in combination with the computing device causes or programs computing device 1200 to be a special-purpose machine. According to one embodiment, the techniques herein are performed by computing device 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computing device 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computing device 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computing device 1200, are example forms of transmission media.

Computing device 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A machine-implemented method comprising:
   determining an initial denoised pixel value for a color component of a particular pixel based at least in part upon a value of the color component of the particular pixel and values of the color component of a set of other pixels;
   for at least a first pixel in the set of other pixels, determining whether the first pixel is to be used in denoising the particular pixel;
   in response to determining that the first pixel is to be used to denoise the particular pixel, determining a weight value to be assigned to the first pixel;
   determining the initial denoised pixel value for the particular pixel based at least in part upon the weight value and a value of the color component for the first pixel;
   determining a type of image environment in which the particular pixel is situated, the type of image environment being one of a set comprising (a) edge/line and (b) detail;
   based at least in part upon the type of image environment, determining an adjusted denoising power value for the color component of the particular pixel; and
   based at least in part upon the initial denoised pixel value and the adjusted denoising power value, determining a final denoised pixel value for the color component of the particular pixel.

2. The method of claim 1, further comprising:
   based at least in part upon the adjusted denoising power value, determining a final denoised pixel value for one or more additional pixels above the particular pixel and one or more additional pixels below the particular pixel.

3. The method of claim 2, wherein the particular pixel and the additional pixels above and below the particular pixel are all part of a matrix of pixels, and wherein the final denoised pixel value for the particular pixel and the final denoised pixel values for the additional pixels above and below the particular pixel are all determined by processing pixel values in the same matrix of pixels.

4. The method of claim 3, wherein determining whether the first pixel is to be used in denoising the particular pixel comprises:
   determining a difference indicator value that indicates how different the first pixel is to the particular pixel; and
   determining whether the difference indicator value is within a range of values that indicates that the first pixel is sufficiently similar to the particular pixel to be used in denoising the particular pixel.

5. The method of claim 4, wherein the range of values is determined based at least in part upon a difference threshold value, and wherein the difference threshold value is determined based at least in part upon the value of the particular pixel.

6. The method of claim 4, wherein determining a weight value to be assigned to the first pixel comprises:
   determining which sub range of the range of values the difference indicator value falls within;
   assigning a first weight value to the first pixel if the difference indicator value falls within a first sub range; and
   assigning a second and different weight value to the first pixel if the difference indicator value falls within a second and different sub range.

7. The method of claim 1, wherein the set of other pixels consists of four pixels, two vertically aligned with the particular pixel, and two horizontally aligned with the particular pixel.

8. The method of claim 1, wherein determining the type of image environment in which the particular pixel is situated comprises determining a score value that indicates a likelihood that the particular pixel is situated on an edge or line feature of an image.

9. The method of claim 1, wherein determining the type of image environment in which the particular pixel is situated comprises determining a score value that indicates an amount of detail surrounding the particular pixel in an image.

10. The method of claim 1, wherein determining the adjusted denoising power value comprises:
    determining an initial denoising power value; and
    determining the adjusted denoising power value based at least in part upon the initial denoising power value.

11. The method of claim 10, wherein determining the initial denoising power value comprises:
    determining a first denoising power value; and
    based at least in part a radial distance between the particular pixel and a center of an image to which the particular pixel belongs, adjusting the first denoising power value as a function of the radial distance to produce the initial denoising power value.

12. The method of claim 10, wherein determining the initial denoising power value comprises:
    determining a signal level estimate based at least in part upon the value of the particular pixel and one or more values of one or more pixels neighboring the particular pixel; and
    determining the initial denoising power value based at least in part upon the signal level estimate.

13. The method of claim 1, wherein determining the adjusted denoising power value comprises:
    if the type of image environment is (a) edge/line, determining the adjusted denoising power value based at least in part upon a score value that indicates a likelihood that the particular pixel is situated on an edge or line feature of an image;
    if the type of image environment is (b) detail, determining the adjusted denoising power value based at least in part upon a score value that indicates an amount of detail surrounding the particular pixel in an image.

14. A non-transitory computer-readable medium storing processor executable instructions for performing the method of claim 1.

15. A device comprising one or more logic elements configured for:
    determining an initial denoised pixel value for a color component of a particular pixel based at least in part upon a value of the color component of the particular pixel and values of the color component of a set of other pixels;
    for at least a first pixel in the set of other pixels, determining whether the first pixel is to be used in denoising the particular pixel;

in response to determining that the first pixel is to be used to denoise the particular pixel, determining a weight value to be assigned to the first pixel;

determining the initial denoised pixel value for the particular pixel based at least in part upon the weight value and a value of the color component for the first pixel;

determining a type of image environment in which the particular pixel is situated, the type of image environment being one of a set comprising (a) edge/line and (b) detail;

based at least in part upon the type of image environment, determining an adjusted denoising power value for the color component of the particular pixel; and based at least in part upon the initial denoised pixel value and the adjusted denoising power value, determining a final denoised pixel value for the color component of the particular pixel.

16. The device of claim 15, further comprising one or more logic elements configured for:

based at least in part upon the adjusted denoising power value, determining a final denoised pixel value for one or more additional pixels above the particular pixel and one or more additional pixels below the particular pixel.

17. The device of claim 16, wherein the particular pixel and the additional pixels above and below the particular pixel are all part of a matrix of pixels, and wherein the final denoised pixel value for the particular pixel and the final denoised pixel values for the additional pixels above and below the particular pixel are all determined by processing pixel values in the same matrix of pixels.

18. The device of claim 16, wherein determining whether the first pixel is to be used in denoising the particular pixel comprises:

determining a difference indicator value that indicates how different the first pixel is to the particular pixel; and determining whether the difference indicator value is within a range of values that indicates that the first pixel is sufficiently similar to the particular pixel to be used in denoising the particular pixel.

19. The device of claim 18, wherein the range of values is determined based at least in part upon a difference threshold value, and wherein the difference threshold value is determined based at least in part upon the value of the particular pixel.

20. The device of claim 18, wherein determining a weight value to be assigned to the first pixel comprises:

determining which sub range of the range of values the difference indicator value falls within;

assigning a first weight value to the first pixel if the difference indicator value falls within a first sub range; and assigning a second and different weight value to the first pixel if the difference indicator value falls within a second and different sub range.

21. The device of claim 15, wherein the set of other pixels consists of four pixels, two vertically aligned with the particular pixel, and two horizontally aligned with the particular pixel.

22. The device of claim 15, wherein determining the type of image environment in which the particular pixel is situated comprises determining a score value that indicates a likelihood that the particular pixel is situated on an edge or line feature of an image.

23. The device of claim 15, wherein determining the type of image environment in which the particular pixel is situated comprises determining a score value that indicates an amount of detail surrounding the particular pixel in an image.

24. The device of claim 15, wherein determining the adjusted denoising power value comprises:

determining an initial denoising power value; and determining the adjusted denoising power value based at least in part upon the initial denoising power value.

25. The device of claim 24, wherein determining the initial denoising power value comprises:

determining a first denoising power value; and based at least in part a radial distance between the particular pixel and a center of an image to which the particular pixel belongs, adjusting the first denoising power value as a function of the radial distance to produce the initial denoising power value.

26. The device of claim 24, wherein determining the initial denoising power value comprises:

determining a signal level estimate based at least in part upon the value of the particular pixel and one or more values of one or more pixels neighboring the particular pixel; and determining the initial denoising power value based at least in part upon the signal level estimate.

27. The device of claim 15, wherein determining the adjusted denoising power value comprises:

if the type of image environment is (a) edge/line, determining the adjusted denoising power value based at least in part upon a score value that indicates a likelihood that the particular pixel is situated on an edge or line feature of an image;

if the type of image environment is (b) detail, determining the adjusted denoising power value based at least in part upon a score value that indicates an amount of detail surrounding the particular pixel in an image.

* * * * *